US009195768B2

(12) United States Patent
Jenkins et al.

(10) Patent No.: US 9,195,768 B2
(45) Date of Patent: Nov. 24, 2015

(54) REMOTE BROWSING SESSION MANAGEMENT

(75) Inventors: Jonathan A. Jenkins, Seattle, WA (US); Brett R. Taylor, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 937 days.

(21) Appl. No.: 13/219,521

(22) Filed: Aug. 26, 2011

(65) Prior Publication Data
US 2013/0054675 A1    Feb. 28, 2013

(51) Int. Cl.
G06F 15/16      (2006.01)
G06F 17/30      (2006.01)
G06F 15/173     (2006.01)
G06F 3/00       (2006.01)

(52) U.S. Cl.
CPC .... G06F 17/30873 (2013.01); G06F 17/30899 (2013.01)

(58) Field of Classification Search
CPC ............... G06F 17/30873; G06F 17/30899
See application file for complete search history.

(56) References Cited

U.S. PATENT DOCUMENTS

| 5,634,064 | A | 5/1997 | Warnock et al. |
| 5,872,850 | A | 2/1999 | Klein et al. |
| 5,961,593 | A | 10/1999 | Gabber et al. |
| 6,049,812 | A | 4/2000 | Bertram et al. |
| 6,108,637 | A | 8/2000 | Blumenau |
| 6,138,156 | A | 10/2000 | Fletcher et al. |
| 6,195,679 | B1 | 2/2001 | Bauersfeld et al. |
| 6,397,253 | B1 * | 5/2002 | Quinlan et al. ............... 709/227 |
| 6,430,624 | B1 | 8/2002 | Jamtgaard et al. |
| 6,549,941 | B1 | 4/2003 | Jaquith et al. |
| 6,560,620 | B1 | 5/2003 | Ching |
| 6,625,624 | B1 | 9/2003 | Chen et al. |

(Continued)

FOREIGN PATENT DOCUMENTS

| JP | 2001-525574 A | 12/2001 |
| JP | 2002-091851 A | 3/2002 |

(Continued)

OTHER PUBLICATIONS

Chen, H., et al., "Bringing Order to the Web: Automatically Categorizing Search Results," Proceedings of the SIGCHI Conference on Human Factors in Computing Systems, Apr. 1-6, 2000, pp. 145-152.

(Continued)

*Primary Examiner* — Wen-Tai Lin
(74) *Attorney, Agent, or Firm* — Knobbe, Martens, Olson & Bear, LLP

(57) ABSTRACT

A remote browsing process is directed to the generation and management of a remote persistent browsing context at a network computing provider. A client computing device requests a remote persistent browsing context instance at a network computing provider. The network computing provider provides processing results corresponding to processed representations of requested content to the client computing device. The persistent browsing context may be maintained at the network computing provider subsequent to the user ending his interaction with the browser application at the client device. A client computing device may subsequently request access to the persistent browsing context maintained at the network computing and storage device.

22 Claims, 17 Drawing Sheets

(56) References Cited

U.S. PATENT DOCUMENTS

| | | | |
|---|---|---|---|
| 6,704,024 B2 | 3/2004 | Robotham et al. |
| 6,785,864 B1 | 8/2004 | Te et al. |
| 6,871,236 B2 | 3/2005 | Fishman et al. |
| 6,944,665 B2 | 9/2005 | Brown et al. |
| 6,963,850 B1 | 11/2005 | Bezos et al. |
| 7,003,442 B1 | 2/2006 | Tsuda |
| 7,051,084 B1 | 5/2006 | Hayton et al. |
| 7,054,952 B1 | 5/2006 | Schwerdtfeger et al. |
| 7,085,736 B2 | 8/2006 | Keezer et al. |
| 7,159,023 B2 | 1/2007 | Tufts |
| 7,171,478 B2 | 1/2007 | Lueckhoff et al. |
| 7,191,211 B2 | 3/2007 | Tuli |
| 7,353,252 B1 | 4/2008 | Yang et al. |
| 7,373,313 B1 | 5/2008 | Kahle et al. |
| 7,543,059 B2 | 6/2009 | Johnson et al. |
| 7,792,944 B2 | 9/2010 | DeSantis et al. |
| 7,831,582 B1 | 11/2010 | Scofield et al. |
| 7,975,000 B2 | 7/2011 | Dixon et al. |
| 7,996,912 B2 | 8/2011 | Spalink et al. |
| 8,010,545 B2 | 8/2011 | Stefik et al. |
| 8,015,496 B1 | 9/2011 | Rogers |
| 8,060,463 B1 | 11/2011 | Spiegel |
| 8,073,850 B1 | 12/2011 | Hubbard et al. |
| 8,103,742 B1 | 1/2012 | Green |
| 8,185,621 B2 | 5/2012 | Kasha |
| 8,249,904 B1 | 8/2012 | DeSantis et al. |
| 8,271,887 B2 | 9/2012 | Offer et al. |
| 8,316,124 B1 | 11/2012 | Baumback et al. |
| 8,336,049 B2 | 12/2012 | Medovich |
| 2001/0039490 A1 | 11/2001 | Verbitsky et al. |
| 2002/0030703 A1 | 3/2002 | Robertson et al. |
| 2002/0194302 A1 | 12/2002 | Blumberg |
| 2003/0023712 A1 | 1/2003 | Zhao et al. |
| 2003/0041106 A1 | 2/2003 | Tuli |
| 2004/0083294 A1 | 4/2004 | Lewis |
| 2004/0139208 A1 | 7/2004 | Tuli |
| 2004/0181613 A1 | 9/2004 | Hashimoto et al. |
| 2004/0205448 A1 | 10/2004 | Grefenstette et al. |
| 2004/0220905 A1 | 11/2004 | Chen et al. |
| 2004/0243622 A1 | 12/2004 | Morisawa |
| 2005/0010863 A1 | 1/2005 | Zernik |
| 2005/0060643 A1 | 3/2005 | Glass et al. |
| 2005/0138382 A1 | 6/2005 | Hougaard et al. |
| 2005/0183039 A1 | 8/2005 | Revis |
| 2005/0246193 A1 | 11/2005 | Roever et al. |
| 2006/0085766 A1 | 4/2006 | Dominowska et al. |
| 2006/0095336 A1 | 5/2006 | Heckerman et al. |
| 2006/0122889 A1 | 6/2006 | Burdick et al. |
| 2006/0168510 A1 | 7/2006 | Bryar et al. |
| 2006/0184421 A1 | 8/2006 | Lipsky et al. |
| 2006/0248442 A1 | 11/2006 | Rosenstein et al. |
| 2006/0265472 A1* | 11/2006 | Seitz et al. ................ 709/217 |
| 2006/0277167 A1 | 12/2006 | Gross et al. |
| 2006/0294461 A1 | 12/2006 | Nadamoto et al. |
| 2007/0022072 A1 | 1/2007 | Kao et al. |
| 2007/0027672 A1 | 2/2007 | Decary et al. |
| 2007/0094241 A1 | 4/2007 | Blackwell et al. |
| 2007/0124693 A1 | 5/2007 | Dominowska et al. |
| 2007/0139430 A1 | 6/2007 | Korn et al. |
| 2007/0240160 A1 | 10/2007 | Paterson-Jones et al. |
| 2007/0288589 A1 | 12/2007 | Chen et al. |
| 2008/0028334 A1 | 1/2008 | De Mes |
| 2008/0104502 A1 | 5/2008 | Olston |
| 2008/0183672 A1 | 7/2008 | Canon et al. |
| 2008/0184128 A1 | 7/2008 | Swenson et al. |
| 2008/0320225 A1 | 12/2008 | Panzer et al. |
| 2009/0012969 A1 | 1/2009 | Rail et al. |
| 2009/0164924 A1 | 6/2009 | Flake et al. |
| 2009/0204478 A1 | 8/2009 | Kaib et al. |
| 2009/0217199 A1 | 8/2009 | Hara et al. |
| 2009/0248680 A1 | 10/2009 | Kalavade |
| 2009/0254867 A1 | 10/2009 | Farouki et al. |
| 2009/0282021 A1 | 11/2009 | Bennett |
| 2009/0287698 A1 | 11/2009 | Marmaros et al. |
| 2009/0327914 A1 | 12/2009 | Adar et al. |
| 2010/0036740 A1 | 2/2010 | Barashi |
| 2010/0057639 A1 | 3/2010 | Schwarz et al. |
| 2010/0125507 A1 | 5/2010 | Tarantino, III et al. |
| 2010/0131594 A1 | 5/2010 | Kashimoto |
| 2010/0138293 A1 | 6/2010 | Ramer et al. |
| 2010/0218106 A1 | 8/2010 | Chen et al. |
| 2010/0293190 A1 | 11/2010 | Kaiser et al. |
| 2010/0312788 A1 | 12/2010 | Bailey |
| 2010/0318892 A1 | 12/2010 | Teevan et al. |
| 2010/0332513 A1 | 12/2010 | Azar et al. |
| 2011/0022957 A1 | 1/2011 | Lee |
| 2011/0029854 A1 | 2/2011 | Nashi et al. |
| 2011/0055203 A1 | 3/2011 | Gutt et al. |
| 2011/0078140 A1 | 3/2011 | Dube et al. |
| 2011/0078705 A1 | 3/2011 | Maclinovsky et al. |
| 2011/0119661 A1 | 5/2011 | Agrawal et al. |
| 2011/0161849 A1 | 6/2011 | Stallings et al. |
| 2011/0173177 A1 | 7/2011 | Junqueira et al. |
| 2011/0173637 A1 | 7/2011 | Brandwine et al. |
| 2011/0178868 A1 | 7/2011 | Garg et al. |
| 2011/0185025 A1 | 7/2011 | Cherukuri et al. |
| 2011/0191327 A1 | 8/2011 | Lee |
| 2011/0197121 A1 | 8/2011 | Kletter |
| 2011/0246873 A1 | 10/2011 | Tolle et al. |
| 2011/0289074 A1 | 11/2011 | Leban |
| 2011/0296341 A1 | 12/2011 | Koppert |
| 2011/0302510 A1 | 12/2011 | Harrison et al. |
| 2012/0072821 A1 | 3/2012 | Bowling |
| 2012/0084644 A1 | 4/2012 | Robert et al. |
| 2012/0096365 A1 | 4/2012 | Wilkinson et al. |
| 2012/0110017 A1 | 5/2012 | Gu et al. |
| 2012/0137201 A1 | 5/2012 | White et al. |
| 2012/0143944 A1 | 6/2012 | Reeves et al. |
| 2012/0150844 A1 | 6/2012 | Lindahl et al. |
| 2012/0166922 A1 | 6/2012 | Rolles |
| 2012/0198516 A1 | 8/2012 | Lim |
| 2012/0215834 A1 | 8/2012 | Chen et al. |
| 2012/0215919 A1 | 8/2012 | Labat et al. |
| 2012/0284629 A1 | 11/2012 | Peters et al. |
| 2012/0317295 A1 | 12/2012 | Baird et al. |
| 2012/0331406 A1 | 12/2012 | Baird et al. |
| 2013/0007101 A1 | 1/2013 | Trahan et al. |
| 2013/0007102 A1 | 1/2013 | Trahan et al. |
| 2013/0031461 A1 | 1/2013 | Hou et al. |
| 2013/0080611 A1 | 3/2013 | Li et al. |

FOREIGN PATENT DOCUMENTS

| | | |
|---|---|---|
| JP | 2003-337794 A | 11/2003 |
| JP | 2010-205111 | 9/2010 |
| WO | WO 2013/003631 A2 | 1/2013 |

OTHER PUBLICATIONS

Bango, Rey, "How JS & Ajax work in Opera Mini 4", Nov. 2, 2007, XP055050107, Retrieved from the Internet.

Brinkmann, M., "Record and Share your browser history with Hooeey," ghacks.net, Feb. 26, 2008, 6 pages, printed on Jan. 25, 2013.

Considine, A., "The Footprints of Web Feet," The New York Times, Mar. 4, 2011, 3 pages, printed on Jan. 25, 2013.

EyeBrowse: Record, Visualize and Share your Browser History, Information Aesthetics, Sep. 18, 2009, 2 pages, printed on Jan. 25, 2013.

Feuerstein, Adam, "Flyswat Takes Aim," San Francisco Business Times, printed from http://www.bizjournals.com/sanfrancisco/stories/1999/10/25/story2.html?t=printable, Oct. 22, 1999, 2 pages.

Gabber, et al., "How to Make Personalized Web Browsing Simple, Secure, and Anonymous," Financial Cryptography, 16 pages (1997).

Gingerich, Jason, "Keycorp Making Site Into Portal," KRTBN Knight-Ridder Tribune Business News (South Bend Tribune, Indiana), Oct. 25, 1999, 2 pages.

Hopper, D. Ian, "Desktops Now Have Power to Comparison-Shop," Oct. 18, 1999, printed from http://www.cnn.com/Tech/computing/9910/18/r.u.sure/index.html, 3 pages.

Van Kleek, M., Introducing "Eyebrowse"—Track and share your web browsing in real time, Haystack Blog, Aug. 28, 2009, 3 pages, printed on Jan. 25, 2013.

(56) References Cited

OTHER PUBLICATIONS

Web page titled "RSS Ticker: Add-ons for Firefox," https://addons.mozilla.org/en-US/firefox/addon/rss-ticker/, 3 printed pages, printed on Feb. 7, 2013.

Web page titled "What Internet Users Do on a Typical Day, Trend Data (Adults), Pew Internet & American Life Project," printed from http://pewinternet.org/Static-Pages/Trend-Data-(Adults)/Online-Activities-Daily.aspx on Nov. 29, 2012, 4 pages.

Rao, H.C.-H., et al., "A Proxy-Based Personal Web Archiving Service," Operating Systems Review, 35(1):61-72, 2001.

Teevan, J., et al., "Changing How People View Changes on the Web," 2009, Proceedings of the 22$^{nd}$ Annual ACM Symposium on User Interface Software and Technology, New York, 2009, pp. 237-246.

Close 'n' Forget Firefox add on, Evilfantasy's blog, http://evilfantasy.wordpress.com/2009/03/24/dose-%E2%80%98n%E2%80%99-forget-firefox-add-on/, retrieved Mar. 24, 2009, 1 page.

Baumann, A., et al. "Enhancing STEM Classes Using Weave: A Collaborative Web-based Visualization Environment," 2011 IEEE Integrated STEM Education Conference, Apr. 2, 2011, 4 pages.

De Carvalho, L., et al., "Synchronizing Web Browsing Data with Browserver," 2010 IEEE Symposium on Computers and Communications, Jun. 22, 2010, 6 pages.

Baumann, A., et al., Enhancing STEM Classes Using Weave: A Collaborative Web-Based Visualization Environment, Integrated Stem Education Conference, Apr. 2, 2011, Ewing, New Jersey, pp. 2A-1-2A-4.

De Carvalho, L.G., et al., Synchronizing Web Browsing Data With Browserver, Proceedings of the IEEE Symposium on Computers and Communications, Jun. 22-25, 2010, Riccione, Italy, pp. 738-743.

\* cited by examiner

REMOTE BROWSING SESSION MANAGEMENT

BACKGROUND

Generally described, computing devices and communication networks can be utilized to exchange information. In a common application, a computing device can request content from another computing device via the communication network. For example, a user at a personal computing device can utilize a software browser application, typically referred to as a browser, to request a Web page from a server computing device via the Internet. In such embodiments, the user computing device can be referred to as a client computing device and the server computing device can be referred to as a content provider. Generally, the user may request, obtain, and interact with a number of requested Web pages or other content simultaneously or in sequence through the software browser application.

With reference to an illustrative example, as part of a term of browsing on a client computing device, a user may request one or more Web pages or other content from a content provider via the Internet or from a local source. In one specific embodiment, each Web page or piece of content may be visually represented as displayed in one or more windows or tabs within the software browser application. Illustratively, the user may interact with the one or more Web pages or other content. For example, the user may enter data in a form on a Web page, or change an attribute of a Web page or piece of content. The user may further open or close tabs or windows in the software browser application, follow links or otherwise request additional Web pages or content, or any number of other activities that may modify the internal state or presentation of the browser, one or more Web pages, or other content during the term of browsing. The displayed content, content state, and browser state at a point in time during the browse session may be referred to as a browsing context.

Generally, exiting a software browser application may end a term of browsing, and may accordingly cause the browsing context associated with the term of browsing to be lost. For example, closing a browser with several open tabs corresponding to Web pages, and subsequently reopening a new instance of a software browser application may cause the new instance to load a default Web page, or to send new requests for the Web pages corresponding to the open tabs of the original browser. Accordingly, any user interactions or changes made to the state of the Web pages displayed in the original browser will not be displayed in the new browser instance. Still further, a user opening a software browser application on a different client computing device may be unable to continue a term of browsing begun on the first client computing device.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
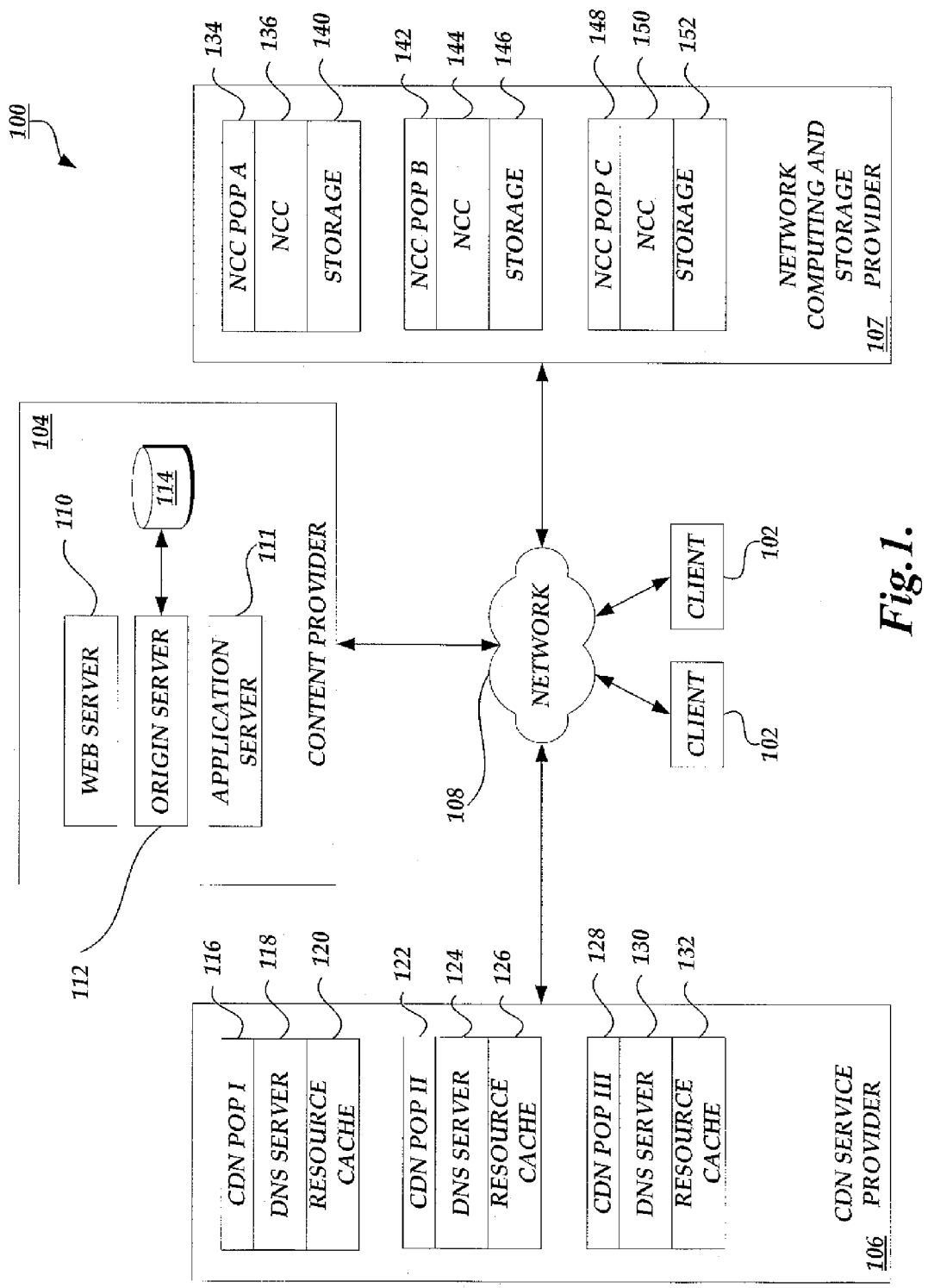
FIG. 1 is a block diagram illustrative of a content delivery environment including a number of client computing devices, content provider, a content delivery network service provider, and a network computing provider.

Generally described, the present disclosure is directed to the generation and management of a remote application session between client computing devices and content providers in conjunction with a network computing provider. Specifically, aspects of the disclosure will be described with regard to the request for a new persistent browsing context by a client computing device with a content provider. Additionally, aspects of the disclosure will be described with regard to the establishment of a remote persistent browsing context at a network computing provider. Still further, aspects of the disclosure will be described with regard to the transmission of browser and client state data and client interaction data between the client computing device and the network computing provider. Although aspects of the embodiments described in the disclosure will focus, for the purpose of illustration, on the management of a persistent browsing context relating to a software browsing application, one skilled in the art will appreciate that the techniques disclosed herein may be applied to any number of software processes or applications. Additionally, the present disclosure is not intended to require the combination of any of the described aspects. Further, although various aspects of the disclosure will be described with regard to illustrative examples and embodiments, one skilled in the art will appreciate that the disclosed embodiments and examples should not be construed as limiting.

With reference to an illustrative example, a user may cause a client computing device to load a software browser application (henceforth referred to as a "browser") for accessing content provided by one or more content providers. Illustratively, the accessed content may include a collection of one or more network resources (e.g., a Web page) and embedded resources such as images, video, audio, text, executable code, and other resources. In one embodiment, the browser may have a content display area or pane for displaying the accessed network content in addition to one or more local interface components, such as toolbars, menus, buttons, or other user interface controls. Local interface components may be managed and controlled by the software browser application or any other process executing or implemented locally at the client computing device. Illustratively, managing user interface controls locally may allow for a responsive user interface, as interactions by the user are processed locally on the client computing device.

Subsequent to the browser being loaded, in one embodiment, the client computing device may exchange persistent browsing context environment information with the network computing provider defining or identifying one or more persistent browsing context preferences or other background information (e.g., bookmarks, browser history, etc) to be associated with the persistent browsing context. In a further embodiment, the persistent browsing context environment information may include information identifying one or more existing persistent browsing contexts at the network computing provider that may be accessible to the client computing device. Subsequent to, before, or simultaneous with the exchange of persistent browsing context environment information, the client computing device may provide a new persistent browsing context request to the network computing provider. The address or location of a network computing provider capable to service the persistent browsing context request may be hardcoded into the browser, may be configurable by the user, may be obtained from a network address service, or may be determined in any other way.

In an illustrative embodiment, responsive to the persistent browsing context request received from the client computing device, the network computing provider may instantiate or cause to have instantiated one or more computing components associated with the network computing provider that will host a browser software application. For example, the network computing provider can instantiate, or cause to have instantiated, an instance of a virtual machine that includes a software browser application capable of maintaining a persistent browsing context. In another example, the network computing provider may instantiate or identify a data store for storing data corresponding to various content, content states, and browser states comprising a persistent browsing context.

Illustratively, the client computing device may provide one or more content requests to the network computing provider including information identifying one or more sources for the requested content. The identifiers can be in the form of network addresses of network resources, such as a Web site or other network accessible piece of content. For example, the user may select or enter a URL, (e.g., http://www.xyzwebsite.com) into a browser window, causing the client computing device to transmit a request for a new content to the network computing provider, including the selected URL.

In response to the one or more content requests, the network computing provider may create new remote browse sessions for one or more of the new content requests. The network computing provider may request the identified network resource(s) from one or more content providers, a content delivery network, or a local or associated cache component. For example, the browser software application on the instantiated network computing component can process a primary network resource and then generate additional content requests for content identified in one or more embedded resource identifiers (e.g. pictures, video files, etc.). Illustratively, in the case of other, non-browser, applications, network resources, or content may include any file type or format known in the art and supported by the specific software application.

Having obtained the initially requested content (e.g., the requested network resource and embedded resources), the network computing provider may identify a remote session browsing configuration specifying a remote session communication protocol for use in transmitting the requested content, user interaction data, intermediate processing results, and other information between the browser being executed on the client computing device and the browser being executed at the instantiated network computing component on the computing and storage provider. The information exchanged between the browser on the instantiated network computing component and the browser on the client computing device can be generally referred to as "browser session information."

In addition to specifying a remote session communication protocol for transmitting information between the client computing device and the instantiated network computing component, in one embodiment, the identified remote session browsing configuration may specify that one or more processing actions to be performed on the requested content are to be performed at the network computing provider rather than, or in addition to, at the client computing device. In accordance with the selected remote session browsing configuration, the client computing device and the instantiated network computing component may exchange browser session information such as processing results (e.g., state data or display data representing the requested content), user interaction information, and subsequent content requests. The client computing device may display the processing results and other browser session information for the user and accept various inputs and interactions from the user to provide to the network computing provider. Accordingly, in some embodiments, the user may experience the requested content similarly to as though the user was processing the requested content locally at the client computing device.

Subsequent to establishing the persistent browsing context and requesting content, the user may choose to end his term of browsing at the client computing device. For example, the user may close or exit the browser on the client computing device, power down the client computing device, or simply turn his attention away from the content displayed at the browser on the client computing device. Illustratively, the persistent browsing context may be maintained at the network computing provider regardless of the user ending his interaction with the browser application at the client device. For example, the network computing provider may maintain one or more components of a software browser application associated with the persistent browsing context running at the network computing provider, may store information associated with the persistent browsing context state, or any combination thereof.

Illustratively, the user may choose to interact with the persistent browsing context further at some later point in time. For example, the user may open a new instance of a software browser application at the client computing device, or may open a new instance of a software browser application on a second client computing device and request access to the persistent browsing context. Accordingly, the client computing device may request access to the persistent browsing context maintained at the network computing and storage device. The network computing and storage device may provide browser session information associated with the persistent browsing context (e.g., processing results associated with the content and state) to the client computing device for display in the browser. The browser at the client computing device may process the browser session information to display representations of the content at the client computing device. Illustratively, from the perspective of the user, the state and appearance of the content displayed at the client computing device may thus appear to duplicate or appear similar to the state and appearance of the content before the user ended his prior term of browsing.

FIG. 1 is a block diagram illustrative of a networked computing environment 100 for the management and processing of content requests. As illustrated in FIG. 1, the networked computing environment 100 includes a number of client computing devices 102 (generally referred to as clients) for requesting content and content processing from a content provider 104, CDN service provider 106, or network computing provider 107. In an illustrative embodiment, the client computing devices 102 can corresponds to a wide variety of computing devices including personal computing devices, laptop computing devices, hand-held computing devices, terminal computing devices, mobile devices (e.g., mobile phones, tablet computing devices, etc.), wireless devices, various electronic devices and appliances and the like. In subsequent figures, the client computing devices 102 may be individually labeled for the purposes of illustration as client computing device 102A and client computing device 102B. It should be understood that each client computing device 102A and 102B may be the same as or different than each other or any other client computing device 102. Further, while two client computing devices 102 are depicted here for the purposes of illustration, it should be understood that any number of client computing devices 102 may be utilized in association with the subject matter as disclosed. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet. The client computing devices 102 may have varied local computing resources such as central processing units and architectures, memory, mass storage, graphics processing units, communication network availability and bandwidth, etc.

The networked computing environment 100 can also include a content provider 104 in communication with the one or more client computing devices 102 or other service providers (e.g., CDN service provider 106, network computing provider 107, etc.) via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102 or other service providers. The content provider 104 can further include an origin server component 112 and associated storage component 114 corresponding to one or more computing devices for obtaining and processing requests for network resources from the CDN service provider. The content provider 104 can still further include an application server computing device 111, such as a data streaming server, for processing streaming content requests. One skilled in the relevant art will appreciate that the content provider 104 can be associated with various additional computing resources, such as additional computing devices for administration of content and resources, DNS name servers, and the like. For example, although not illustrated in FIG. 1, the content provider 104 can be associated with one or more DNS name server components that would be authoritative to resolve client computing device DNS queries corresponding to a domain of the content provider.

With continued reference to FIG. 1, the networked computing environment 100 can further include a CDN service provider 106 in communication with the one or more client computing devices 102 and other service providers via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 116, 122, 128 that correspond to nodes on the communication network 108. Each CDN POP 116, 122, 128 includes a DNS component 118, 124, 130 made up of a number of DNS server computing devices for resolving DNS queries from the client computers 102. Each CDN POP 116, 122, 128 also includes a resource cache component 120, 126, 132 made up of a number of cache server computing devices for storing resources from content providers and transmitting various requested resources to various client computers. The DNS components 118, 124, and 130 and the resource cache components 120, 126, 132 may further include additional software and/or hardware components that facilitate communications including, but not limited to, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the CDN POPs 116, 122, 128 are illustrated in FIG. 1 as logically associated with the CDN service provider 106, the CDN POPs will be geographically distributed throughout the communication network 108 in a manner to best serve various demographics of client computing devices 102. Additionally, one skilled in the relevant art will appreciate that the CDN service provider 106 can be associated with various additional computing resources, such as additional computing devices for administration of content and resources, and the like.

With further continued reference to FIG. 1, the networked computing environment 100 can also include a network computing provider 107 in communication with the one or more client computing devices 102, the CDN service provider 106, and the content provider 104 via the communication network 108. The network computing provider 107 illustrated in FIG.

1 also corresponds to a logical association of one or more computing devices associated with a network computing provider. Specifically, the network computing provider 107 can include a number of Point of Presence ("POP") locations 134, 142, 148 that correspond to nodes on the communication network 108. Each POP 134, 142, 148 includes a network computing component (NCC) 136, 144, 150 for hosting applications, such as data streaming applications, via a number of instances of a virtual machine, generally referred to as an instance of an NCC. One skilled in the relevant art will appreciate that NCC 136, 144, 150 would include physical computing device resources and software to provide the multiple instances of a virtual machine or to dynamically cause the creation of instances of a virtual machine. Such creation can be based on a specific request, such as from a client computing device, or the NCC can initiate dynamic creation of an instance of a virtual machine on its own. Each NCC POP 134, 142, 148 also includes a storage component 140, 146, 152 made up of a number of storage devices for storing any type of data used in the delivery and processing of network or computing resources, including but not limited to user data, state information, processing requirements, historical usage data, and resources from content providers that will be processed by an instance of an NCC 136, 144, 150 and transmitted to various client computers, etc. In some embodiments, the network computing provider 107 may be considered as a network computing and storage provider. The NCCs 136, 144, 150 and the storage components 140, 146, 152 may further include additional software and/or hardware components that facilitate communications including, but not limited to, load balancing or load sharing software/hardware components for selecting instances of a virtual machine supporting a requested application and/or providing information to a DNS nameserver to facilitate request routing.

In an illustrative embodiment, NCCs 136, 144, 150 and the storage components 140, 146, 152 are considered to be logically grouped, regardless of whether the components, or portions of the components, are physically separate. For example, a network computing provider 107 may maintain separate POPs for providing the NCC and the storage components. Additionally, although the NCC POPs 134, 142, 148 are illustrated in FIG. 1 as logically associated with a network computing provider 107, the NCC POPs will be geographically distributed throughout the communication network 108 in a manner to best serve various demographics of client computing devices 102. Additionally, one skilled in the relevant art will appreciate that the network computing provider 107 can be associated with various additional computing resources, such additional computing devices for administration of content and resources, and the like. Even further, one skilled in the relevant art will appreciate that the components of the network computing provider 107 and components of the CDN service provider 106 can be managed by the same or different entities.

With reference now to FIGS. 2-6, the interaction between various components of the networked computing environment 100 of FIG. 1 will be illustrated. Specifically, FIGS. 2-6 illustrate the interaction between various components of the networked computing environment 100 for the exchange of content between a client computing device 102 and a content provider 104 via the network computing provider 107. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
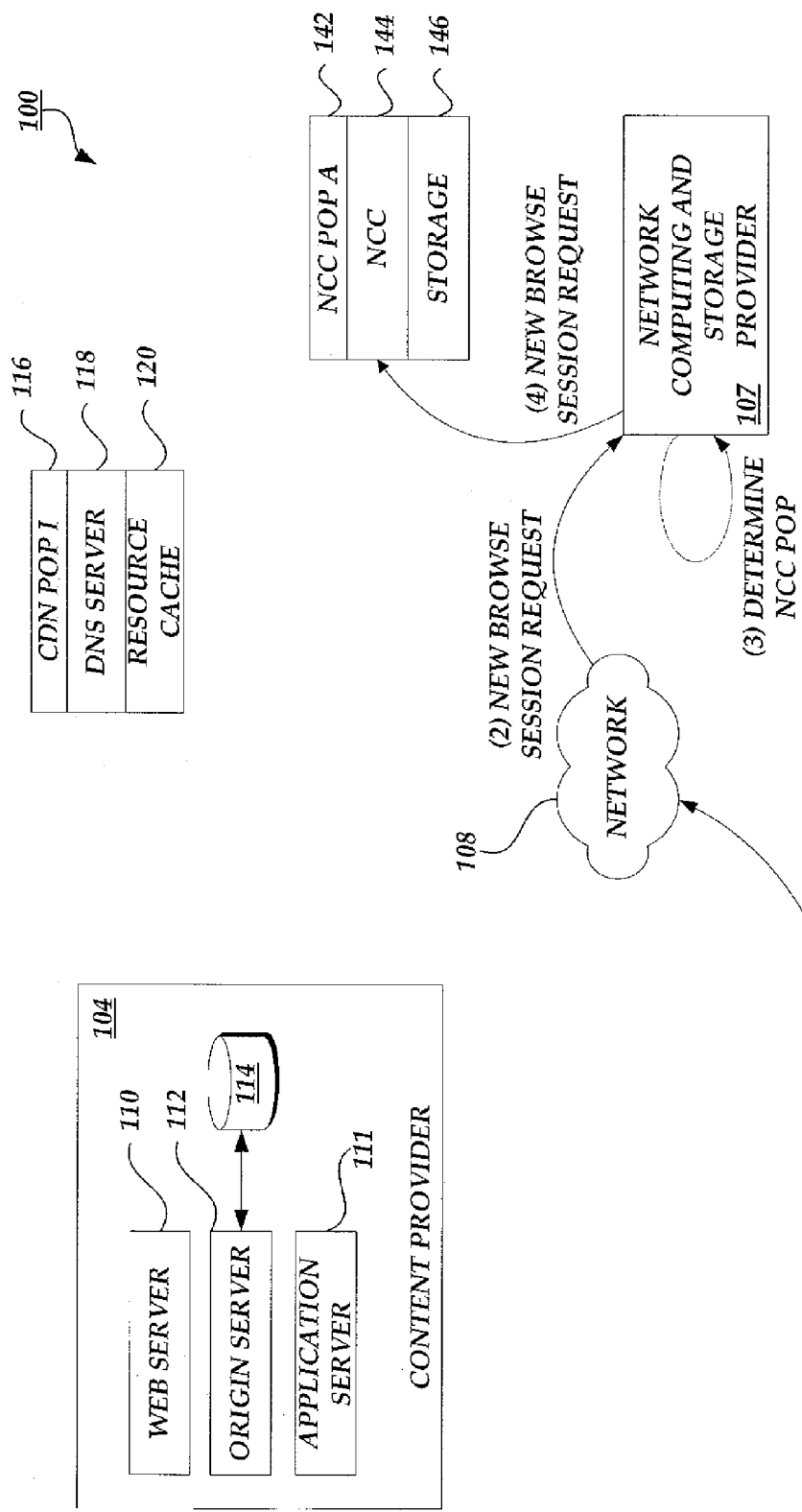
FIG. 2 is a block diagram of the content delivery environment of FIG. 1 illustrating the generation and processing of a new browse session request from a client computing device to a network computing provider.

With reference to FIG. 2, the process can begin with the generation and processing of a browse session request from a client computing device 102 to a network computing provider 107. Illustratively, the client computing device 102 may load a browser for viewing network content in response to an event or user request. Subsequent to the browser being loaded, the browser may be implemented to request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. As illustrated in FIG. 2, the browse session request is transmitted first to a network computing provider 107. In an illustrative embodiment, the network computing provider 107 utilizes a registration application program interface ("API") to accept browse session requests from the client computing device 102. The browse session request can include network address information corresponding to a requested network resource, which may be in any form, including, but not limited to, an Internet Protocol ("IP") address, a URL, a Media Access Control ("MAC") address, etc.

Subsequent to the receipt of the browse session request, the network computing provider 107 may select an associated network computing component (hereinafter "NCC") point of presence (hereinafter "POP") such as NCC POP 142 to service the browse session request. The selection of the NCC POP may determine the processing and network resources available to the instantiated virtual machine. The selection of processing and network resources and the provisioning of software at the NCC POP instance may be done, at least in part, in order to optimize communication with content providers 104 and client computing devices 102.

Figure 3:
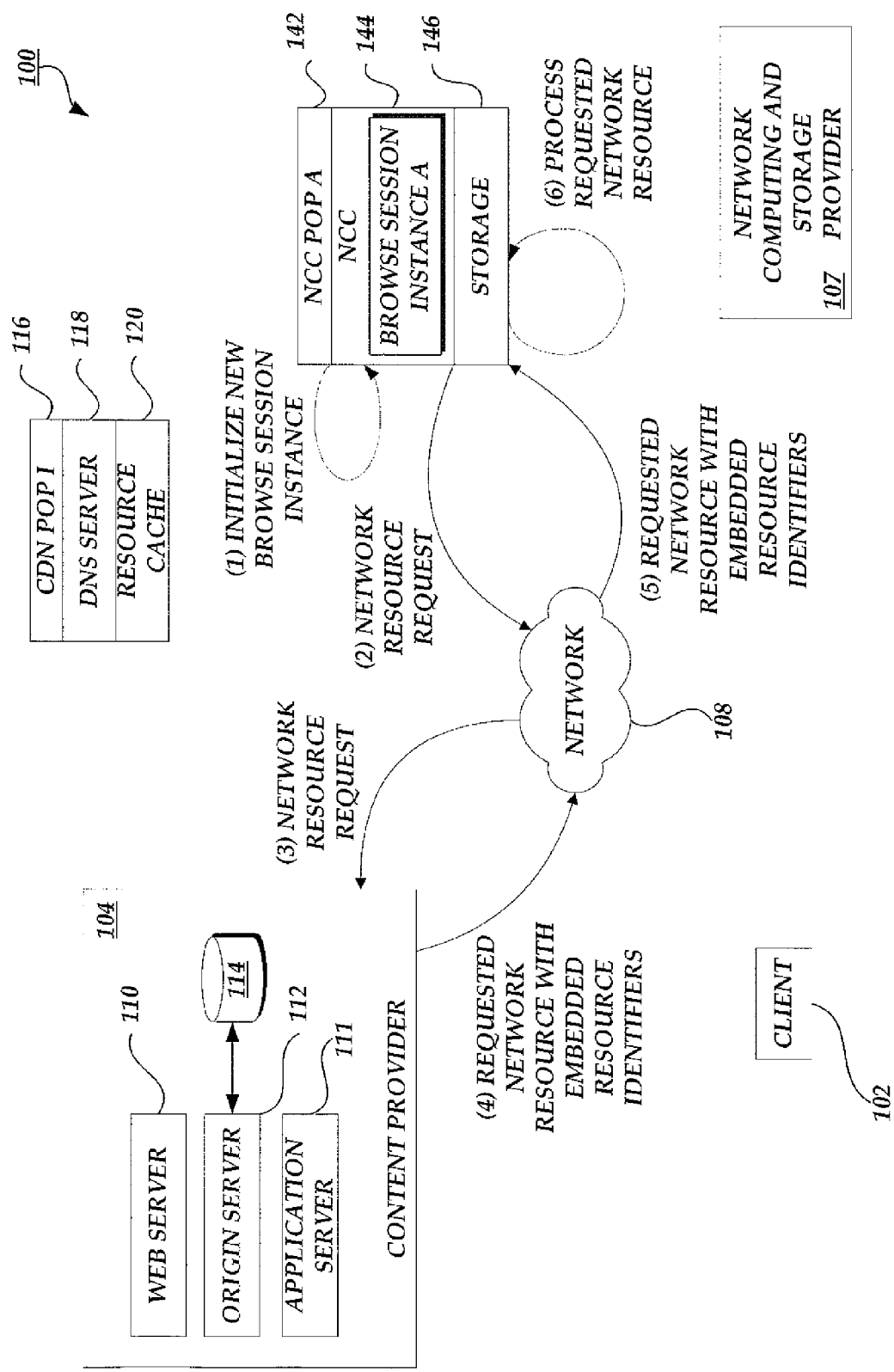
FIG. 3 is a block diagram of the content delivery environment of FIG. 1 illustrating the generation and processing of a request for a network resource from a network computing provider to a content provider.

With reference to FIG. 3, an illustrative interaction for generation and processing of a request for a network resource from a network computing provider 107 to a content provider 104 will be described. As illustrated in FIG. 3, the selected NCC POP 142 may generate a browse session corresponding to one or more content providers based on a browse session request, such as the illustrative browse session request depicted in FIG. 2 above. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session.

Subsequent to initializing a new browse session instance, NCC POP 142 may provide a request for a network resource to a content provider 104 based on a network address included in the browse session request. For example, a browse session request may include a URL for a Web page, such as "http://www.xyzsite.com/default.htm." NCC POP 142 may resolve the URL to an IP address through a DNS resolver associated with the network computing provider (not shown), and may request the Web page from the content provider 104 at the resolved IP address. In various embodiments, a network resource may be retrieved from any combination of content providers, content delivery network (hereinafter "CDN") servers, or caches associated with the network computing provider 107. For example, the network computing provider may check if a resource is stored in a local cache or in another server or service provider associated with the network computing provider 107. If a network resource is stored in a local or associated location, the NCC POP 142 may retrieve the network resource from the local or associated location rather than from the third party content provider 104 or CDN service provider 106. Illustratively, the NCC POP 142 may provide requests for any number of network resources as included in the browse session request, and may obtain these network resources from any number of different sources, sequentially or in parallel.

As illustrated in FIG. 3, the content provider 104 receives the resource request from the NCC POP 142 and processes the request accordingly. In one embodiment, the content provider 104 processes the resource request as if it were originally provided by the client computing device 102. For example, the content provider 104 may select the type of content, ordering of content, or version of content according to the requirements of the requesting client computing device 102. In another embodiment, the content provider 104 may be provided with information that provides information associated with the NCC POP 142 for utilization in providing the requested content (e.g., an available amount of processing resources or network bandwidth).

Subsequent to obtaining the requested network resource from the content provider 104 (or other source designated by the content provider), the NCC POP 142 may process the network resource to extract embedded resource identifiers and gather information for determination of a remote session browsing configuration. For example, a network resource such as a Web page may include embedded CSS style information and Javascript as well as embedded resource identifiers to additional resources such as text, images, video, audio, animation, executable code, and other HTML, CSS, and Javascript files. In the process of extracting the embedded resource identifiers, the NCC POP 142 may gather information about the processed network resources for later use in the determination of a remote session browsing configuration as discussed below with reference to FIG. 4.

Figure 4:
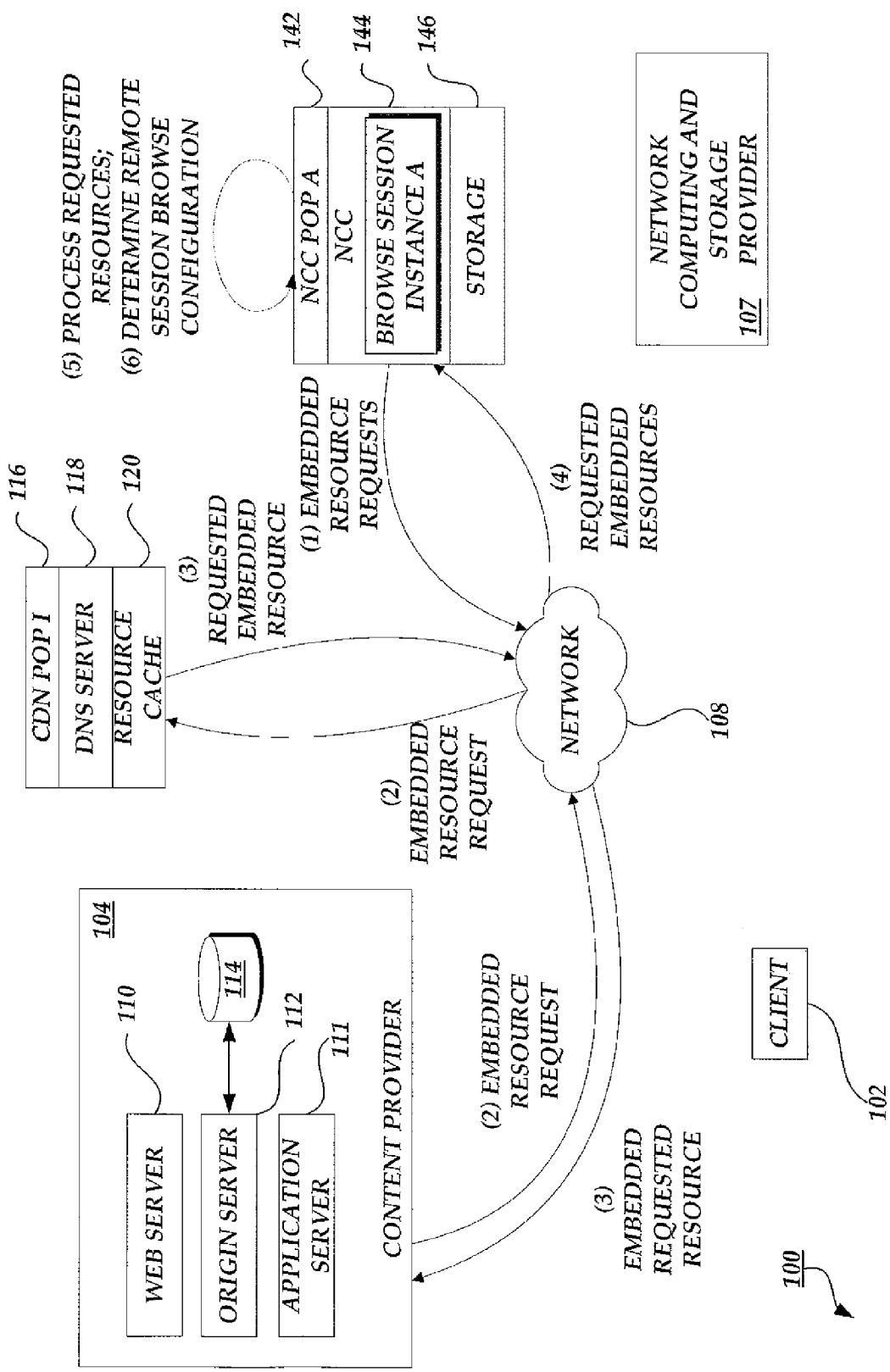
FIG. 4 is a block diagram of the content delivery environment of FIG. 1 illustrating the generation and processing of one or more requests corresponding to one or more embedded resources from a network computing provider to a content provider and content delivery network.

With reference to FIG. 4, an illustrative interaction for generation and processing of one or more requests corresponding to one or more embedded resources from a network computing provider to a content provider and content delivery network is disclosed. As illustrated in FIG. 4, the selected NCC POP 142 may provide resource requests to one or more sources of content such as content provider 104 and CDN POP 116. The resource requests may correspond to embedded resources based on one or more embedded resource identifiers extracted from a requested network resource (e.g., a Web page) as described in FIG. 3 above. In various embodiments, embedded resources may be retrieved from any combination of content providers, CDN servers, or caches associated with the network computing provider 107. For example, the network computing provider may check if an embedded resource is stored in a local cache or in another server or service provider associated with the network computing provider 107. If an embedded resource is stored in a local or associated location, the NCC POP 142 may retrieve the embedded resource from the local or associated location rather than the third party content provider or CDN. Illustratively, the NCC POP 142 may provide requests for any number of embedded resources referenced by a network resource, and may obtain these embedded resources from any number of different sources, sequentially or in parallel. Subsequent to obtaining the requested resources, the NCC POP 142 may process the resources and requested content to determine a remote session browsing configuration for the processing and communication of content to the client computing device 102.

Figure 5:
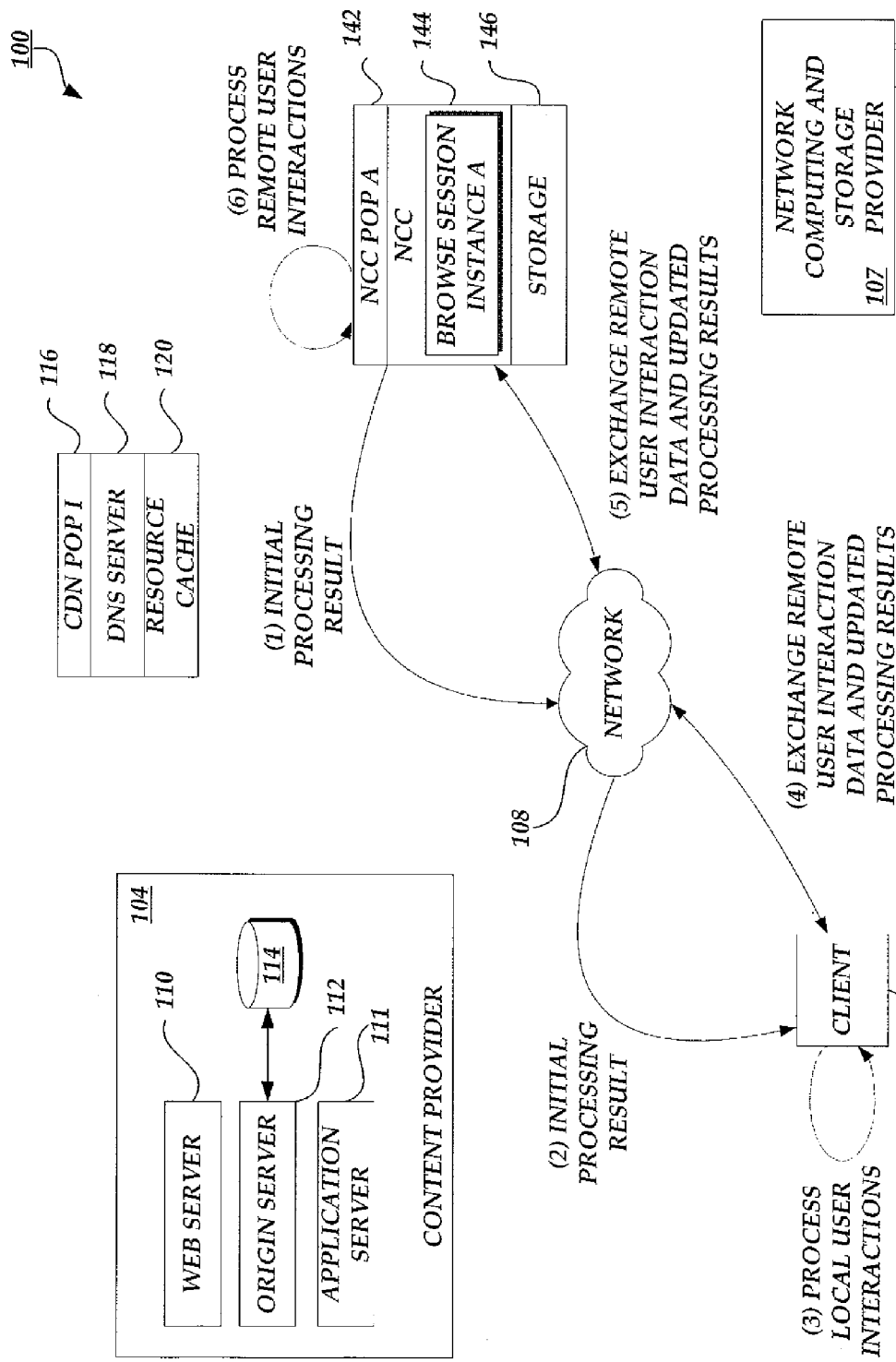
FIG. 5 is a block diagram of the content delivery environment of FIG. 1 illustrating the generation and processing of browse session data and user interaction data between a network computing provider and client computing device.

With reference to FIG. 5, an illustrative interaction for generation and processing of processing results and user interaction data between a network computing provider and client computing device is disclosed. As previously described, in one embodiment, the respective browsers on the instantiated network computing component and the client computing device 102 can exchange browsers' session information related to the allocation and processing of the requested resources at the instantiated network computing component and client computing device. As illustrated in FIG. 5, the selected NCC POP 142 may provide an initial processing result to the client computing device 102 over the network 108. The initial processing result may correspond to requested network content, such as a Web page, along with associated embedded resources processed by the NCC POP 142 in accordance with a selected remote session browsing configuration as described in FIG. 4 above. The NCC POP 142 also makes a determination of which additional processes will be conducted at the NCC POP 142, at the client computing device 102, or both. Subsequent to receiving an initial processing result and the allocation of processes, the client computing device 102 may perform any remaining processing actions on the initial processing result as required by the selected remote session browsing configuration, and may display the fully processed content in a content display area of a browser. The client computing device 102 may process any local user interactions with local interface components or content elements locally, and may provide user interactions requiring remote processing to the network computing provider 107. The network computing provider 107 may provide updated processing results to the client computing device in response to changes to the content or remote user interaction data from the client computing device.

Figure 6:
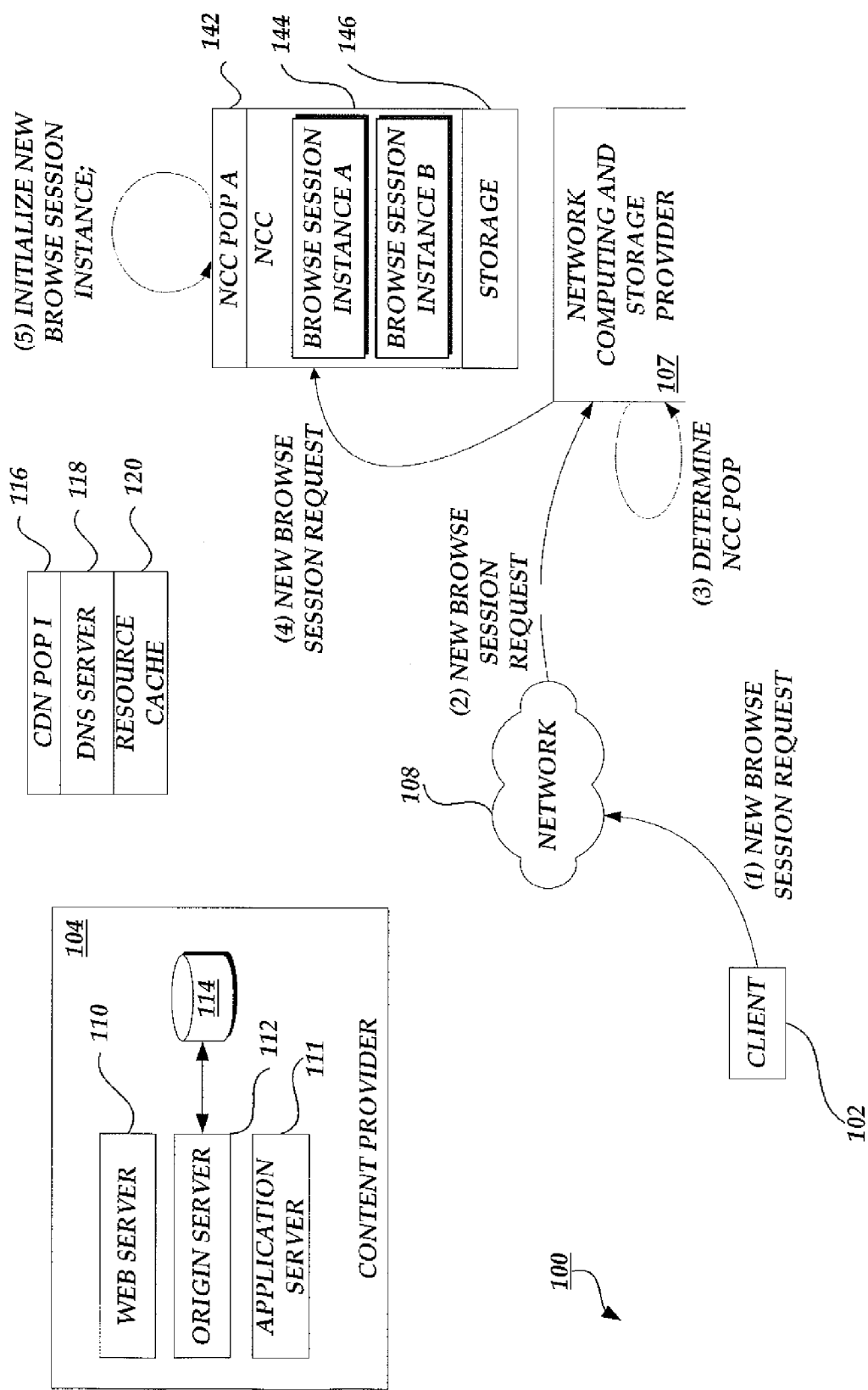
FIG. 6 is a block diagram of the content delivery environment of FIG. 1 illustrating the generation and processing of an additional new browse session request from a client computing device to a network computing provider.

With reference to FIG. 6, a block diagram of the content delivery environment of FIG. 1 illustrating the generation and processing of an additional new browse session request from a client computing device to a network computing provider is disclosed. As illustrated in FIG. 6, a second new browse session request may be sent to network computing provider 107 from client computing device 102 across network 108. In an illustrative embodiment, the network computing provider 107 utilizes a registration API to accept browse session requests from the client computing device 102.

The additional browse session request may be generated by a client computing device 102 in response to a user opening up a new browser window with a new content display area, opening a new content display area in an existing browser window (e.g., opening a new tab in a browser), requesting new network content in an existing content display area (e.g., following a link to a new network resource, or entering a new network address into the browser), or any other user interaction. For example, a user browsing a first Web page corresponding to a first browse session instance may follow a link that opens a new tab or browser window to view a second Web page. In one embodiment, any required steps of obtaining and processing content associated with the second Web page may be performed by the currently instantiated network computing component in which the browser can handle the processing of both resource requests. In another embodiment, the client computing device 102 request may be processed as a new browse session request to the network computing provider 107, including the network address of the second Web page. In this embodiment, the browser on the client computing device may not specifically request a separate browse session, and a user's interaction with the browser on the client computing device 102 may appear to be part of a same browsing session. As described above with regard to FIGS. 2 and 3, the network computing provider 107 may cause an instantiation of a network computing component for obtaining and processing content associated with the second web page. In other embodiments, a new browse session request may be generated by the client computing device 102 corresponding to sections of a network resource (e.g., frames of a Web page), individual network resources, or embedded resources themselves, data objects included in a set of content, or individual network resources.

Illustratively, the additional browse session request may include any number of pieces of data or information including, but not limited to, information associated with a user, information associated with the client computing device 102 (e.g., hardware or software information, a device physical or logical location, etc.), information associated with the network 108, user or browser preferences (e.g., a requested remote session browse protocol, a preference list, a decision tree, or other information), information associated with the network computing provider 107, information associated with one or more pieces of requested network content (e.g., the network address of a network resource), etc. Requested content may include any manner of digital content, including Web pages or other documents, text, images, video, audio, executable scripts or code, or any other type of digital resource.

Subsequent to the receipt of the browse session request, the network computing provider 107 may select an associated network computing component such as NCC POP 142 to service the browse session request. As discussed above with reference to FIG. 2, a network computing provider 107 may select an NCC POP to service a browse session request based on any number of factors, including, but not limited to available NCC POP resources (e.g., available memory, processor load, network load, etc), a financial cost of servicing the browse session request at the NCC POP, the NCC POP location respective to a client computing device 102, content provider 112, or CDN POP 116, a NCC POP cache status (e.g., whether a requested resource is already stored in an NCC POP cache), etc. In one embodiment, the network computing provider 107 may select a number of NCC POPs to service a browse session request. Illustratively, although the network computing provider 107 is depicted here for purposes of illustration as selecting NCC POP 142, the network computing provider 107 may select any extant NCC POP to service the browse session request. For example, a single client computing device 102 may simultaneously or sequentially provide three different browse session requests to the network computing provider 107 corresponding to different network resources. The network computing provider 107 may select different NCC POPs for each browse session request, the same NCC POP for all three browse session requests, or any combination thereof. As discussed above, the decision whether to select a different NCC POP than was utilized for a previous or simultaneous browse session request may be made on the basis of available system resources, randomly, or according to any other factor as discussed above and with regards to FIG. 2.

Figure 7:
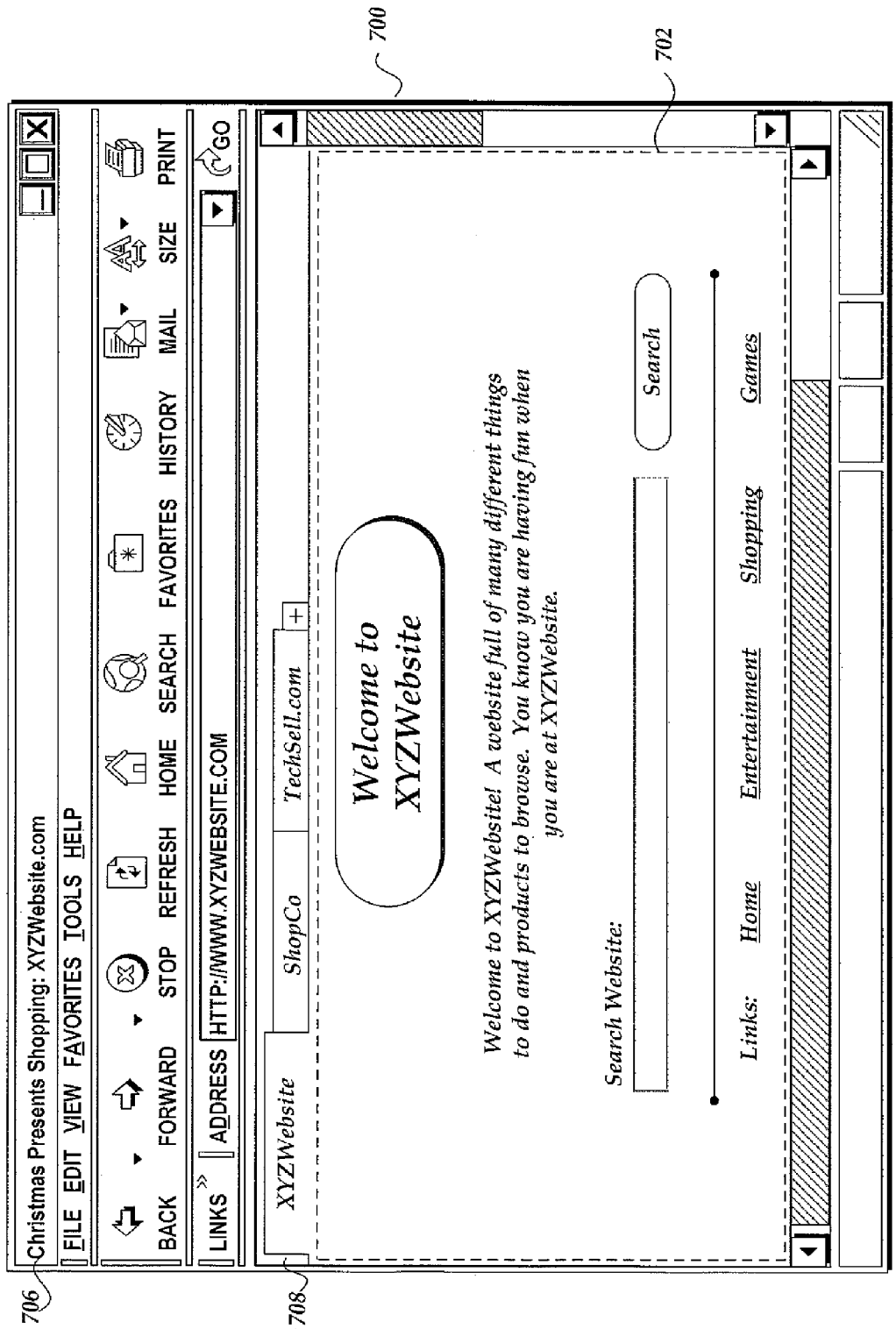
FIG. 7 is a user interface diagram depicting an illustrative browser interface and display of browse session content.

FIG. 7 is a user interface diagram depicting an illustrative browser interface and display of browse session content. As described above with reference to FIG. 5, a browser 700 may have a content display area 702, as well as one or more one or more local interface components. These local interface components may include toolbars, menus, buttons, address bars, scroll bars, window resize controls, or any other user interface controls. Illustratively, local interface components may be displayed as separate from the content display area or may be overlaid or embedded in the content display area.

Interactions with local interface components may be treated as local user interactions or remote user interactions depending on the processing required by the interaction and the remote session browsing configuration. For example, the selection of a preferences option in a browser menu may be handled entirely as a local user interaction by a browser. The processing required to display the menu, provide visual feedback regarding the selection, display the preferences window, and process the changes made to the browser preferences may be performed locally. As discussed above, processing user interactions locally may provide greater responsiveness at the browser as opposed to sending user interaction data to the NCC POP 142 for processing. As another example, when using a remote session browsing configuration that specifies extensive processing on the NCC POP 142 (e.g., a remote session browsing configuration using a remote session communication protocol such as RDP), the selection of a content refresh button in a browser toolbar may be handled both as a local user interaction and a remote user interaction. The limited processing required to provide interface feedback corresponding to the button selection may be handled at the client computing device 102 in order to provide the appearance of interface responsiveness, while the refresh command, which may require processing of the network content displayed in the content display area of the browser, may be sent as user interaction data to the NCC POP 142 for processing. The NCC POP 142 may then transmit updated processing results corresponding to the refreshed network content back to the client computing device 102 for display.

In one embodiment, a window of a browser 700 may correspond to a remote persistent browsing context. With regards to this specific embodiment, browser 700 may include a persistent browsing context name 706 or other identifying visual indicia of a current persistent browsing context. In one embodiment, a persistent browsing context may include multiple Web pages or other network content organized as content tabs 708 in a window of a browser 700. Illustratively, the content and display states associated with the content organized in content tabs 708 may be maintained at the network computing provider 107 after the browser 700 is closed or exited. Accordingly, a new instance of a browser on the same or a different client computing device 102 may reload the content and content tabs 708 from processing results provided by the storage provider 107 upon subsequently accessing the existing persistent browsing context.

Figure 8:
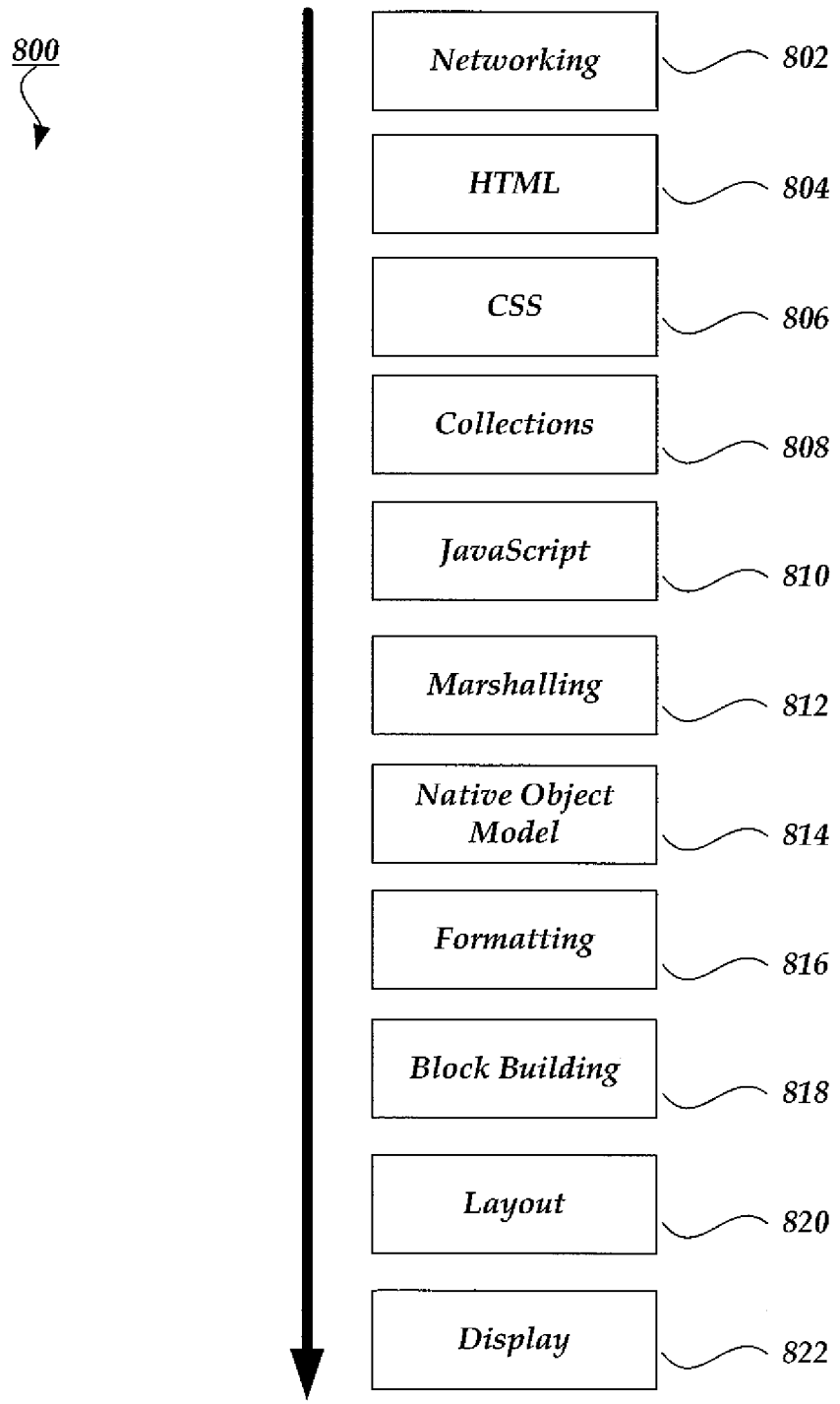
FIG. 8 is a diagram depicting illustrative browser content processing actions as a series of processing subsystems.

FIG. 8 is a diagram depicting illustrative browser content processing actions as a series of processing subsystems 800. In many embodiments, a browser may process sets of content (e.g., network resources such as web pages and associated embedded resources) in a series of processing actions. Illustratively, and as described above with reference to FIGS. 3-5, a remote session browsing configuration may specify a split between processing actions performed at a network computing provider (e.g., an NCC POP) and processing actions performed at a client computing device 102. This split may designate some processing actions to be performed by each of the NCC POP and client computing device 102, or may assign all processing actions to a single device or component. For example, an NCC POP may perform all of these various processing actions at the browse session instance, and send fully processed RDP processing results to the client computing device 102 for bitmap assembly and display. Any number of different remote session browsing configurations may be used by one or more browse sessions instances running at an NCC POP.

One of skill in the relevant art will appreciate that the subsystems shown here are depicted for the purpose of illustration, and are not intended to describe a necessary order or a definitive list of browser subsystems. Various browser software components may implement additional or fewer browser subsystems than are shown here, and may order the subsystems or corresponding processing actions in any number of different ways. Although the processing subsystems 800 depicted here for purposes of illustration are directed at the processing of Web pages or other Web content, one of skill in the relevant art will appreciate that the processing of other file types or network resources may be broken up in a similar manner. For example, one of skill in the relevant art will appreciate that a similar schema may be developed for the processing of images, video, audio, database information, 3d design data, or any other file format or type of data known in the art. Similar schema may also be developed for any number of device operating system or software framework processing operations, such as scheduling, memory or file management, system resource management, process or service execution or management, etc. Further, although the HTML protocol and RDP remote session communication protocols are discussed herein for the purposes of example, one of skill in the relevant art will appreciate that a remote session browsing configuration may implement any number of remote communication protocols for any number of specified processing actions, and that a remote session browsing configuration may be formulated to perform any fraction or combination of the actions identified below at any combination of the client computing device 102 and network computing provider 107.

Illustratively, the first processing subsystem involved in the processing and display of network content is the networking subsystem 802. Illustratively, the networking subsystem 802 may be responsible for all communication between the browser and content provider, including local caching of Web content. The networking subsystem is generally limited by the performance of the user's network. A remote session browsing configuration that splits processing actions at the networking subsystem 802 might include a remote session browsing configuration utilizing an HTML remote session communication protocol, where one or more caching or resource retrieval actions were performed at the NCC POP, but parsing and processing of the content was performed at the client computing device.

As network resources such as HTML documents are downloaded from the server they may be passed to an HTML subsystem 804 which parses the document, initiates additional downloads in the networking subsystem, and creates a structural representation of the document. Modern browsers may also contain related subsystems which are used for XHTML, XML and SVG documents. A remote session browsing configuration that splits processing actions at the HTML subsystem 804 might include a remote session browsing configuration utilizing an HTML remote session communication protocol, where an initial HTML page is processed at the NCC POP in order to extract embedded resource identifiers, but additional parsing and processing of the content is performed at the client computing device. In another embodiment, a remote session browsing configuration that splits processing actions at the HTML subsystem 804 might perform initial processing to create the structural representation of the HTML document, and provides a processing result including the structural representation and associated embedded resources to the client computing device for processing.

When CSS is encountered, whether inside an HTML document or an embedded CSS document, it may be passed to a CSS subsystem 806 to parse the style information and create a structural representation that can be referenced later. Illustratively, a remote session browsing configuration that splits processing actions at a CSS subsystem 806 may construct a processing result including the CSS structural representation and HTML structural representation, and provide the processing result and associated embedded resources to the client computing device for processing.

HTML documents often contain metadata, for example the information described in a document header or the attributes applied to an element. The collections subsystem 808 may be responsible for storing and accessing this metadata. A remote session browsing configuration that splits processing actions at a collections subsystem 808 may construct a processing result including processed metadata along with any other structural representations discussed above, and provide the processing result and associated embedded resources to the client computing device for processing.

When Javascript is encountered, it may be passed directly to a JavaScript subsystem 810 responsible for executing the script. The Javascript subsystem 810 has been examined fully over the years, and may be one of the most well known browser subsystems in the art. A remote session browsing configuration that splits processing actions at a Javascript subsystem 810 may construct a processing result including an internal representation of one or more Javascript scripts, including, but not limited to state data or a representation of the script in a native or intermediate form, as well as any other processed structures or data discussed above, and provide the processing result and associated embedded resources to the client computing device for processing.

Because many JavaScript engines are not directly integrated into the browser, there may be a communication layer including the marshalling subsystem 812 between the browser and the script engine. Passing information through this communication layer may generally be referred to as marshaling. A remote session browsing configuration that splits processing actions at a marshalling subsystem 812 may construct a processing result including marshalling data as well as any other processed structures, scripts, or data discussed above, and provide the processing result and associated embedded resources to the client computing device for processing.

In some embodiments, JavaScript interacts with an underlying network resource such as a Web document through the Document Object Model APIs. These APIs may be provided through a native object model subsystem 814 that knows how to access and manipulate the document and is the primary interaction point between the script engine and the browser. Illustratively, a remote session browsing configuration that splits processing actions at a native object model subsystem 814 may construct a processing result including native object model state data or API calls as well as any other processed structures, scripts, or data discussed above, and provide the processing result and any other associated embedded resources to the client computing device for processing.

Once the document is constructed, the browser may needs to apply style information before it can be displayed to the user. The formatting subsystem 816 takes the HTML document and applies styles. Illustratively, a remote session browsing configuration that splits processing actions at a formatting subsystem 816 may construct a processing result including an HTML representation with applied styles, as well as any other processed state data, API calls, structures, scripts, or data discussed above, and provide the processing result and any other associated embedded resources to the client computing device for processing.

In one embodiment, CSS is a block based layout system. After the document is styled, the next step, at a block building subsystem 818, may be to construct rectangular blocks that will be displayed to the user. This process may determine things like the size of the blocks and may be tightly integrated with the next stage, layout. A remote session browsing configuration that splits processing actions at a block building subsystem 818 may construct a processing result including block information, as well as any other processed state data, API calls, structures, scripts, or data discussed above, and provide the processing result and any other associated embedded resources to the client computing device for processing.

Subsequent to the browser styling the content and constructing the blocks, it may go through the process of laying out the content. The layout subsystem 820 is responsible for this algorithmically complex process. Illustratively, a remote session browsing configuration that splits processing actions at a layout subsystem 820 may process the various state data, API calls, structures, scripts, or data discussed above to construct a processing result including layout information for the client computing device. Illustratively, an NCC POP may make use of various data or settings associated with the client computing device or browser (e.g., as provided in the initial browse session request) in order to generate a suitable layout for the client computing device. For example, a mobile device may provide a screen resolution and a display mode to the NCC POP. The NCC POP may base layout calculations on this screen resolution and display mode in order to generate a processing result corresponding to a content representation suitable for a browser running on the mobile device. Illustratively, in various embodiments, any other subsystem implemented by the NCC POP may make use of data associated with the client computing device or browser in generating a processing result for the client.

The final stage of the process may occur inside the display subsystem 822 where the final content is displayed to the user. This process is often referred to as drawing. A remote session browsing configuration that splits processing actions at the networking subsystem 802 might include a remote session browsing configuration utilizing an RDP remote session communication protocol, where nearly all processing is performed at the NCC POP, and a processing result including bitmap data and low level interface data are passed to the client computing device for display.

Figure 9:
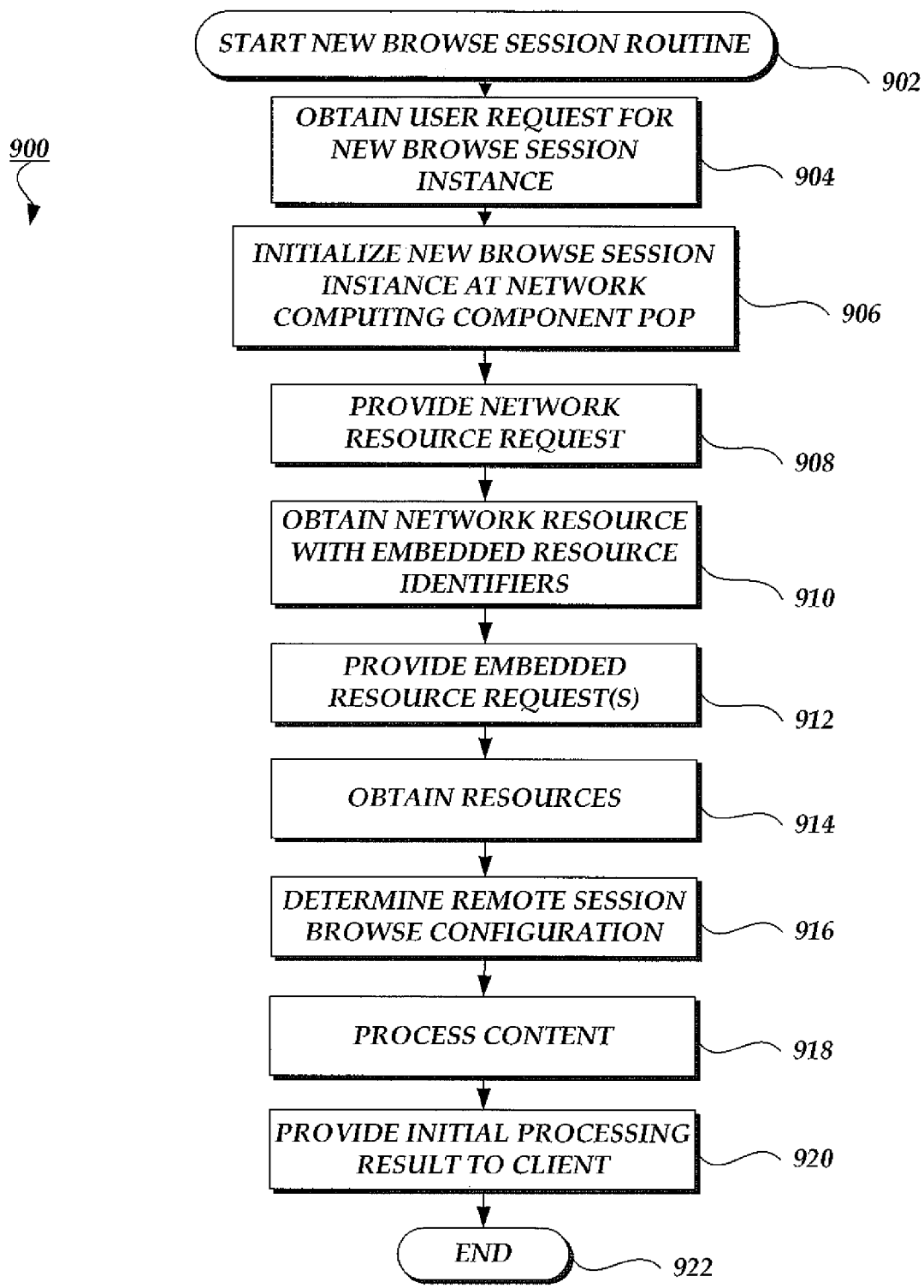
FIG. 9 is a flow diagram illustrative of a new browse session routine implemented by network computing provider.

FIG. 9 is a flow diagram illustrative of a new browse session routine 900 implemented by network computing provider 107 of FIG. 1. New browse session routine 900 begins at block 902. At block 904, the network computing provider 107 receives a new browse session request from client computing device 102. As previously described, the client computing device 102 may load a browser for viewing network content in response to an event or user request. Subsequent to the browser being loaded, the browser may be implemented request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. This browse session request may include one or more addresses or references to various network resources or other content requested by the client computing device 102. In an illustrative embodiment, the browse session request is transmitted in accordance with an API.

At block 906 the network computing provider 107 may select an associated NCC POP to instantiate a new browse session based on the browse session request. As discussed above with reference to FIG. 1, a network computing provider 107 may include any number of NCC POPs distributed across any number of physical or logical locations. A network computing provider 107 may select a NCC POP to service a browse session request based on any number of factors, including, but not limited to available NCC POP resources (e.g., available memory, processor load, network load, etc.), a financial cost of servicing the browse session request at the NCC POP, the NCC POP location respective to a client computing device 102, content provider 104, or CDN POP 116, a NCC POP cache status (e.g., whether a requested resource is already stored in an NCC POP cache), etc.

In one embodiment, the network computing provider 107 may select a number of NCC POPs to service a browse session request. For example, the network computing provider 107 may select two NCC POPs with different logical locations in the network. Each NCC POP may independently request and process network content on the behalf of the client computing device 102, and the client computing device 102 may accept data from the first NCC POP to return a processing result. Subsequent to being selected by the network computing provider 107, NCC POP 142 may obtain the browse session request. In one embodiment, NCC POP 142 may have the browse session request forwarded to it by a component of network computing provider 107. In another embodiment, NCC POP 142 or client computing device 102 may receive connection information allowing the establishment of direct communication between NCC POP 142 and client computing device 102. Illustratively, NCC POP 142 may be provided with the browse session request originally provided to network computing provider 107, may be provided with a subset of information (e.g., just a network address of requested content), or may be provided additional information not included in the original browse session request.

Subsequent to the NCC POP 142 being selected, the network computing provider 107 may cause the NCC POP 142 to instantiate a new browse session. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session. Illustratively, one or more characteristics of the new browse session instance and/or browser instance may be based on client computing device 102 information included in the browse session request. For example, the browse session request may include a device type or browser type, a device screen resolution, a browser display area, or other information defining the display preferences or capabilities of the client computing device 102 or browser. The NCC POP 142 may accordingly instantiate a virtual machine instance and/or a browser instance with the same or similar capabilities as the client computing device 102. Illustratively, maintaining a virtual machine instance and/or browser with the same or similar capabilities as the client computing device 102 may allow the NCC POP 142 to process network content according to the appropriate dimensions and layout for display on the particular client computing device 102.

In some embodiments, the NCC POP 142 may utilize an existing virtual machine instance and/or browser instance in addition to, or as an alternative to, instating a new browse session. For example, subsequent to the NCC POP 142 being selected, the network computing provider 107 may cause the NCC POP 142 to associate an existing browser instance and/or virtual machine instance, such as one or more instances previously instantiated at the NCC POP 142, with the new browse session request. Illustratively, an existing browser session and/or virtual machine instance may correspond to another browse session, remote application session, or other remote process associated with the user or client computing device 102, or may be a previously instantiated software instance from an unrelated browse session or remote process. In other embodiments, the NCC POP 142 may instantiate a new browser or other application process in an existing virtual machine instance, or may combine the utilization of previously instantiated and newly instantiated software processes in any number of other ways. In still further embodiments, the network computing provider or NCC POP 142 may instantiate any number of new virtual machine instances and/or browser instances (or make use of existing instantiated instances) based on a single browse session request.

At block 908 the network computing provider 107 may provide a request for one or more network resources to a content provider or CDN service provider based on a network address included in the browse session request. In various embodiments, one or more network resources may be additionally or alternately retrieved from a cache local to the NCC POP 142 or otherwise associated with the network computing provider 107. One of skill in the art will appreciate that, in the case of other embodiments, the link or network address may correspond to a document or file stored in a digital file locker or other network storage location or at a cache component associated with the network computing provider 107 or client computing device 102. In some embodiments, the new session request may include a document or file in addition to or as an alternative to a network address. At block 910, the network computing provider 107 obtains the one or more network resources. Subsequent to obtaining the requested network resource, the NCC POP 142 may process the network resource to extract embedded resource identifiers.

At block 912, the network computing provider 107 may provide resource requests to one or more sources of content such as content providers, CDN service providers, and caches. The resource requests may correspond to embedded resources based on the one or more embedded resource identifiers extracted from the one or more network resource as described in block 910 above. At block 914, the network computing provider 107 may obtain these embedded resources from any number of different sources, sequentially or in parallel.

At block 916, the network computing provider 107 may process the one or more network resources and associated embedded resources to determine a remote session browsing configuration for the processing and communication of content to the client computing device 102. A remote session browsing configuration may include any proprietary or public remote protocol allowing exchange of data and user interactions or requests between a client and a remote server. The remote session browsing configuration may illustratively include both a remote session communication protocol and a processing schema for providing processed (or unprocessed) content to a client computing device for display in the content display area of a browser.

Illustratively, a remote session browsing configuration may define or specify a remote session communication protocol, including, but not limited to, a network protocol, signaling model, transport mechanism, or encapsulation format for the exchange of state data, user interactions, and other data and content between the network computing provider and the client computing device. Examples of remote session communication protocols known in the art include Remote Desktop Protocol (RDP), X-Windows protocol, Virtual Network Computing (VNC) protocol, Remote Frame Buffer protocol, HTML, etc. For example, RDP illustratively specifies a number of processing mechanisms for encoding client input (e.g., mouse movement, keyboard input, etc.) into protocol data units for provision to a remote computing device, and corresponding mechanisms for sending bitmap updates and low level interface information back to the client device. As another example, the HTML protocol illustratively provides a mechanism for providing files defining interface information and containing resources references from a server to a client, and a corresponding mechanism for a client computing device to provide requests for additional files and resources to the server. In one embodiment, the NCC POP 142 may provide an initial communication to the client computing device 102 after determining the remote session communication protocol. This initial communication may allow the client computing device 102 to prepare to receive communications in the selected remote session communication protocol, and, in the case of pull remote session communication protocols like HTTP, may cause the client computing device to send an initial resource request to the browse session instance running on the NCC POP 142.

Each remote session browsing configuration may additionally define a split of processing actions between the network computing and storage service (e.g., NCC POP 142) and the client computing device (e.g., client computing device 102). In one embodiment, a particular split of processing actions may be based on or mandated by a particular remote session communication protocol. In another embodiment, a remote session communication protocol may allow several different splits of processing actions depending on the implementation or configuration of the protocol. For the purpose of illustration, many pieces of network content (e.g., Web pages, video, Flash documents) may require various processing actions before being displayed on a computing device. A Web page, for example, may be parsed to process various HTML layout information and references to associated resources or embedded content such as CSS style sheets and Javascript, as well as embedded content objects such as images, video, audio, etc. The HTML and each referenced object or piece of code will typically be parsed and processed before a representative object model corresponding to the Web page may be constructed. This object model may then be processed further for layout and display in a content display area of a browser at the client computing device 102. Illustrative browser processing actions are described in greater detail below with reference to FIG. 8. One of skill in the art will appreciate that, in the case of other embodiments or applications, various other processing actions may be required.

A remote session browsing configuration may specify that various of the processing actions required for display of piece of network content be performed at the remote computing device, such as the NCC POP 142, rather than at the client computing device 102. Network content partially (or wholly) processed at the network computing provider may be referred to as a processing result. As discussed below, the split of processing actions may be associated with or linked to the remote session communication protocol used for exchanging data and client input between the NCC POP 142 and client computing device 102.

For example, a remote session communication protocol such as RDP that transmits a processing result including low level interface information and bitmaps to the client computing device 142 for display may be associated with a remote session browsing configuration that specifies performing all, or nearly all, of the necessary content processing actions at the NCC POP 142. While using RDP, the NCC POP 142 may, for example, run a full instance of a browser the NCC POP 142 and transmit a processing result consisting of bitmap updates corresponding to a representation of the displayed content to the client computing device 102. The client computing device 102, in this example, may merely be required to assemble the transmitted bitmap updates for display in the content display area of the browser, and may perform none of the processing of the actual HTML, Javascript, or data objects involved in the display of an illustrative piece of network content. As another example, a remote session browsing configuration utilizing a remote session communication protocol such as HTML may transmit network content in a largely unprocessed form. The client computing device 102 may thus perform all of the processing actions required for display of network content while the NCC POP 142 performs little or no processing.

The NCC POP 142 may base its determination of a remote session browsing configuration on any number of factors, including, but not limited to, one or more characteristics of one or more of the requested resources, content provider 104, or CDN service provider 106, one or more characteristics of the content address or domain, one or more characteristics of the client computing device 102, browser or application, user, one or more characteristics of the NCC POP 142, or one or more characteristics of the network or network connection, etc. Characteristics of requested resources may include, but are not limited to, a data format, a content type, a size, processing requirements, resource latency requirements, a number or type of interactive elements, a security risk, an associated user preference, a network address, a network domain, an associated content provider, etc. Characteristics of a content provider 104, CDN service provider 106, computing device 102, or NCC POP 142 may include, but are not limited to, processing power, memory, storage, network connectivity (e.g., available bandwidth or latency), a physical or logical location, predicted stability or risk of failure, a software or hardware profile, available resources (e.g., available memory or processing, or the number of concurrently open software applications), etc. The NCC POP 142 may further consider perceived security threats or risks associated with a piece of content or domain, preferences of a client computing device or a content provider, computing or network resource costs (e.g., a financial cost of processing or bandwidth, resource usage, etc.), predetermined preferences or selection information, any additional processing overhead required by a particular remote session browsing configuration, a cache status (e.g., whether a particular resources is cached at a NCC POP 142, at the client computing device 102, or at other network storage associated with the network computing provider), a predicted delay or time required to retrieve requested network content, a preferred content provider or agreements with a content provider for a particular remote session browsing configuration or level of service, a remote session browsing configuration being used for another (or the current) browse session by the same user, or any other factor.

In some embodiments, an NCC POP 142 may base a determination of a remote session browsing configuration on past behavior or practice. For example, an NCC POP 142 that has determined a remote browse session configuration for a particular resource in the past may automatically select the same remote browse session configuration when the resource is requested by the same (or potentially a different) user. As another example, a user that has a history of frequently accessing Web sites with extensive processing requirements may automatically be assigned a remote session browsing configuration that performs the majority of processing at the NCC POP 142. In other embodiments, an NCC POP 142 may base a determination of a remote browse session configuration on predictions of future behavior. For example, an NCC POP 142 may base its determination of a remote browse session configuration for a particular resource on an analysis of past determinations made for a particular Web site, network domain, or set of related resources. A content provider that historically has provided video-heavy Web pages may be associated with a remote session browsing configuration that emphasizes video performance at the client computing device 102. Illustratively, past historical analysis and future predictions may be considered as one or more of a number of factors on which to base the remote session browsing configuration determination process, or may be definitive in the decision making process. For example, once an NCC POP 142 determines a remote session browsing configuration for a particular content provider, it may skip the remote session browsing configuration determination process for any future resources served from the content provider. Illustratively, the NCC POP 142 may re-determine a remote session browsing configuration to be associated with the content provider after a fixed period of time, or after the NCC POP 142 has identified or determined a change in the content being served by the content provider.

In other embodiments, a network resource, Web site, network domain, content provider, or other network entity may specify or otherwise request the use of a particular remote browse session configuration in a resource tag, metadata, or other communication with an NCC POP 142. The NCC POP 142 may treat the request as definitive, or may consider the request as one of multiple factors to be considered in the decision making process.

For example, a remote session browsing configuration utilizing a remote session communication protocol such as RDP may specify extensive processing to occur at the network computing provider 107 (e.g., at NCC POP 142) rather than at the client computing device 102. The remote session browsing configuration may thus leverage the processing power of the NCC POP 142 to achieve lower latencies and presentation delay when dealing with network content that requires a great deal of pre-processing (e.g., content with a great deal of CSS or Javascript information defining page layout). The NCC POP 142 may therefore select a remote session browsing configuration that performs a substantial amount of processing at the network computing provider 107 and utilizes RDP or a similar remote session communication protocol for communication of processing-intensive content. Conversely, a remote session browsing configuration that utilizes a remote session communication protocol such as HTML may specify extensive processing at the client computing device 102 rather than at the network computing provider 107. The remote session communication protocol may thus achieve smaller delays and smoother presentation when presented with simple network content that requires very little processing or network content that requires rapid change in displayed content after its initial load. For example, a Web page with embedded video may perform better performing the majority of processing locally and utilizing HTML rather than RDP as a remote session communication protocol. A remote session browsing configuration specifying extensive processing at the network computing provider 107 must process the video at the NCC POP 142 and rapidly send screen updates (e.g. by RDP) to the client computing device 102, potentially requiring a great deal of bandwidth and causing choppy playback in the browser, while a remote session browsing configuration specifying local processing may provide raw video information directly to the client computing device 102 for display (e.g. by HTML), allowing for client side caching and a smoother playback of content.

As a further example, the NCC POP 142 in communication with a client computing device 102 with extremely limited processing power may elect to use a remote session browsing configuration that requires very little processing by the client computing device, for example, using RDP to transmit NCC POP 142 processed results. Conversely, an NCC POP 142 providing an extremely interactive Web page may elect to use a remote session browsing configuration that allows the client computing device 102 to handle user interactions locally in order to preserve interface responsiveness, for example, using HTML to transmit substantially unprocessed data. As a still further example, a NCC POP 142 may base the determination of a remote session browse configuration on preferences provided by the client computing device 102. A client computing device 102 may illustratively include preferences for a remote session browse configuration in an initial browse session request, or at any other time. The NCC POP 142 may utilize these preferences as an alternative to, or in addition to any other factor or decision metric. Illustratively, allowing the client computing device 102 to set or influence the selection of a remote session browse configuration allows the NCC POP 142 to take user preferences in account when determining a remote session browse configuration. For example, a user worried about initial page load times may prefer to use a remote session browsing configuration heavy on remote processing and utilizing an RDP remote session communications protocol, while a user wishing to maintain an extremely responsive interface may prefer using a remote session browsing configuration that performs the majority of the processing on the client computing device 102, for example, using an HTML remote session communication protocol.

Illustratively, the NCC POP 142 may base a determination of a remote browsing configuration on any factor or combination of factors. For example, the NCC POP 142 may select a remote session browsing configuration based on a single factor, or may assign weights to one or more factors in making a determination. In some embodiments, the determination process of the NCC POP 142 may change based on one or more factors described above. For example, an NCC POP 142 communicating with a client computing device 102 over a network with a surplus of unused bandwidth may give a low weight to factors such as the network requirements of a remote browse session, and may give a higher weight to factors such as the latency of page interactions, while an NCC POP 142 communicating with a client computing device 102 over a limited bandwidth network may give a higher weight to factors dealing with the efficiency of the remote session browse protocol over a network.

In one embodiment, the NCC POP 142 may select a single remote session browsing configuration for a set of network content. For example, the NCC POP 142 may select a single remote session browsing configuration for a requested network resource such as a Web page. The NCC POP 142 may thus process the Web page together with all embedded content based on the selected remote browsing session protocol, and utilize the remote browsing session protocol to exchange user interaction data and updated browse session data for all embedded content associated with the Web page. In another embodiment, the NCC POP 142 may select different remote session browsing configurations for one or more resources in a set of network content. For example, a network resource such as a Web page may reference processing intensive embedded Javascript or CSS resources, as well as embedded video resources. The NCC POP 142 may select a first remote session browsing configuration for the Web page and all embedded resources excluding the embedded video resource, and a second remote session browsing configuration for the embedded video resource. Illustratively, this may result in the NCC POP 142 utilizing RDP to send a processing result to the client computing device 102 for display of the Web page and associated embedded resources, while utilizing HTTP to send the embedded video as a separate, unprocessed file. In one embodiment, the client computing device 102 may perform the minimal processing required to display the RDP processing result corresponding to the Web page and embedded resources, and may also perform additional processing necessary to display the embedded video, for example, overlaying the video on top of the displayed RDP representation of the Web page. Any number of remote session browsing configurations may be selected to correspond to any number of resources or objects included in a set of network content, regardless of whether resources or objects are obtained from a content provider 104 or CDN service provider 106 in one or more logical files or data structures.

Although the selection of a remote session browsing configuration is illustratively depicted herein as occurring after all network resources and associated embedded content have been obtained by the NCC POP 142, one skilled in the relevant art will appreciate that the selection of a remote session browsing configuration may be performed at any time. For example, the NCC POP 142 may select a remote session browsing configuration after receiving a new browse session request or related information from the client computing device, may select a remote session browsing configuration after obtaining a network resource, but before obtaining any associated embedded resources, or at any other time. In some embodiments, the NCC POP 142 may switch to a new remote session browsing configuration at some time subsequent to the client computing device 102 obtaining an initial processing result. Illustratively, the NCC POP 142 selecting a new remote session browsing configuration may occur automatically after a certain time period or event or in response to a change in network conditions, NCC POP 142 or client computing device 102 load or computing resources, or any other factor described above as potentially influencing the choice of remote session browsing configuration. Illustratively, an NCC POP 142 dealing with other types or formats of information may select a remote session protocol based on any number of similar factors. For example, one of skill in the relevant art will appreciate that a similar schema may be developed for the processing of images, video, audio, database information, 3d design data, or any other file format or type of data known in the art.

The client computing device 102 may, in various embodiments, further instantiate a parallel browsing process sequentially or simultaneously with the request for a remote browse session. In one embodiment, a client computing device 102 may instantiate a traditional local browse session as known in the art (e.g., providing content requests from the browser and processing obtained resources locally) in addition to one or more remote browse instance executing at an NCC POP 142. In another embodiment, a client computing device 102 may be provided with unprocessed network resources by the NCC POP 142. Illustratively, the network resources may have been retrieved from one or more content providers, CDNs, or cache components by the NCC POP 142. The resources may be provided to the client computing device 102 to process locally in parallel with the remote browse instance executing at the NCC POP 142. In still further embodiments, the network computing provider or NCC POP 142 may instantiate any number of new virtual machine instances and/or browser instances (or make use of existing instantiated instances) to process resources and/or send processing results to the client computing device 102 in parallel. Illustratively, the local browse session at the client computing device 102 and the remote browse session instance at the NCC POP 142 may execute in parallel.

In one embodiment, a local browse session executing at the client computing device 102 may obtain unprocessed content (e.g., html Web pages, embedded content, and other network resources) from the NCC POP 142 responsive to a browse session request. Illustratively, the content may have been retrieved by the NCC POP 142 from a content provider, CDN, or cache in response to the browse session request. The unprocessed content provided by the NCC POP 142 may include all the content associated with the browse session request or may supplement content existing in a cache of the client computing device, retrieved from a content provider or CDN, or obtained from some other source. In one embodiment, a client computing device 102 may obtain all requested content from a local cache, and may not obtain any unprocessed resources or content from the NCC POP 142. Subsequent to obtaining the unprocessed content, client computing device 102 may process the requested content in parallel with a remote browse session executing at the NCC POP 142. For example, as the local browse session executing at the client computing device 102 is processing the requested content, a remote browse session executing at the NCC POP 142 may be processing the same content at substantially the same time. Once the NCC POP 142 has performed a set of processing actions on the content to generate a processing result (e.g., as specified by a determined remote session browsing configuration), the NCC POP 142 may provide the processing result to the client computing device 102.

For the purpose of illustration, a client computing device 102 may require a longer load time to obtain and process requested network resources than a browse session instance running at the NCC POP 142. For example, the NCC POP 142 may obtain and process content quickly due to its position on the network and the relative processing power of the local client computing device as compared to the NCC POP 142. Even if the NCC POP 142 provides the client computing device 102 with all requested network content, the client computing device 102 may still obtain a processing result from NCC POP 142 before the local browse session has fully completed processing the requested resources. The client computing device 102 may complete any further processing steps and display the obtained processing result before completing local processing and display of the content. Illustratively, this may allow the client computing device 102 to take advantage of an NCC POP 142's quicker content load time relative to a traditional local browse session. Prior to the local browse session completing the processing all requested resources, the browser may process any user interactions locally and/or remotely as described in FIGS. 5 and 11 below.

Once the local browse session has fully obtained and processed resources corresponding to the requested content, the computing device 102 may determine whether to continue to display results obtained from the NCC POP 142 (and process user interactions at the NCC POP 142) using the determined remote session browsing configuration or switch to processing user interactions locally. Switching to process user interactions locally may include replacing a displayed representation of the requested resources based on a processing result obtained from the NCC POP 142 with a local display of the requested resources. For example, a browser may display a representation of a Web page corresponding to a processing result from the NCC POP 142 (e.g., RDP display information representing the rendered page) until the browser is finished processing and rendering the Web page locally. The browser may then replace the representation from the NCC POP 142 with the locally rendered representation of the Web page. Illustratively, replacing one representation with another representation may be transparent to the user. For example, the local and NCC POP 142 representations of the Web page may be identical or substantially identical. In one embodiment, when the NCC POP 142 representation of the web page is displayed, the browser may send various user interactions with the displayed page to the NCC POP 142 for processing. When the locally rendered version of the Web page is displayed, user interactions may be processed locally at the browser. Illustratively, the determination of which representation of the requested resources to display (e.g., local or from the NCC POP 142) may be based on any of the same factors described with reference to determining a remote session browse protocol in above.

In one embodiment, the client computing device 102 may switch to processing user interactions locally as soon as local resources are fully loaded. Illustratively, the remote browse session instance running at the NCC POP 142 may be terminated after switching to local processing, or the remote browse session instance may be maintained as a backup in case of unresponsiveness or a failure with regards to the local browse session. For example, the client computing device 102 may process user interactions locally, as well as sending remote user interaction data to the NCC POP 142 in accordance with the selected remote session browsing configuration. The remote user interaction data may be used by the NCC POP 142 to keep the remote browse session instance fully in parallel with the local browse process being executed by the browser at the client computing device 102. As long as the local browse session continues to handle user interactions, the NCC POP 142 may either refrain from sending updated processing results, or may send updated processing results ignored by the client computing device 102. If a problem develops with the local browse session at the client computing device 102, updated processing results may be provided to the client computing device 102 from the NCC POP 142 for processing and display in lieu of the local browse session. Illustratively, this switch from the local browse session to remote processing may be transparent to the user. In some embodiments, the client computing device 102 may switch from a local browse session to a remote browse session instance based on factors other than unresponsiveness or failure at the local browser. For example, the client computing device 102 or network computing and storage component 107 may select between a remote and local browse session based on any of the factors enumerated with regards to determining a remote session browse protocol above In another embodiment, the client computing device 102 may continue to process and display updated processing results from the NCC POP 142 even after the local browse session has fully loaded the requested content. The client computing device 102 may terminate the local browse session or may run the local browse session in parallel as a backup process in the converse of the example provided above. It should be appreciated that although the local browse session is described here for the purpose of illustration as being slower to load than the remote browse session instance, in some embodiments the local browse session may load the content faster than the remote browsing session, in which case the browser may process user interactions locally until the remote browse process has fully loaded the requested content.

In some embodiments, the client computing device 102 may display and process user interactions through whichever browse session, local or remote, loads the requested content first.

In various other embodiments, the network computing provider 107 may instantiate multiple remote browse session instances to run in parallel in addition to or as an alternative to instantiating a local browse session. Illustratively, these parallel browse session instances may utilize any of the same or different remote session browse protocols, and may act as backups in the manner described above with regard to a local browse session, or may be used and switched between as alternatives in order to maximize browser performance at the client computing device 102. For example, in response to one or more browse session requests, the network computing provider 107 may instantiate a browse session instance running on a first NCC POP and utilizing an RDP protocol as well as browse session instance running on a second NCC POP utilizing an X-Windows protocol. The client computing device 102 or the network computing provider 107 may determine which browse session instance and protocol should be used based on performance or resource usage considerations as described with regards to determining a remote session browse protocol above.

With continued reference to FIG. 9, at block 918, the network computing provider 107 may process the obtained content, including the one or more requested network resources and embedded network resources, according to the determined remote session browsing configuration to generate an initial processing result. At block 920, the network computing provider 107 may provide the initial processing result to the client for further processing and display in the content display area of the browser. For the purposes of further example, an illustrative client new browse session interaction routine 1000 implemented by client computing device 102 is described below with reference to FIG. 10. At block 922, the start new browse session routine 900 ends.

Figure 10:
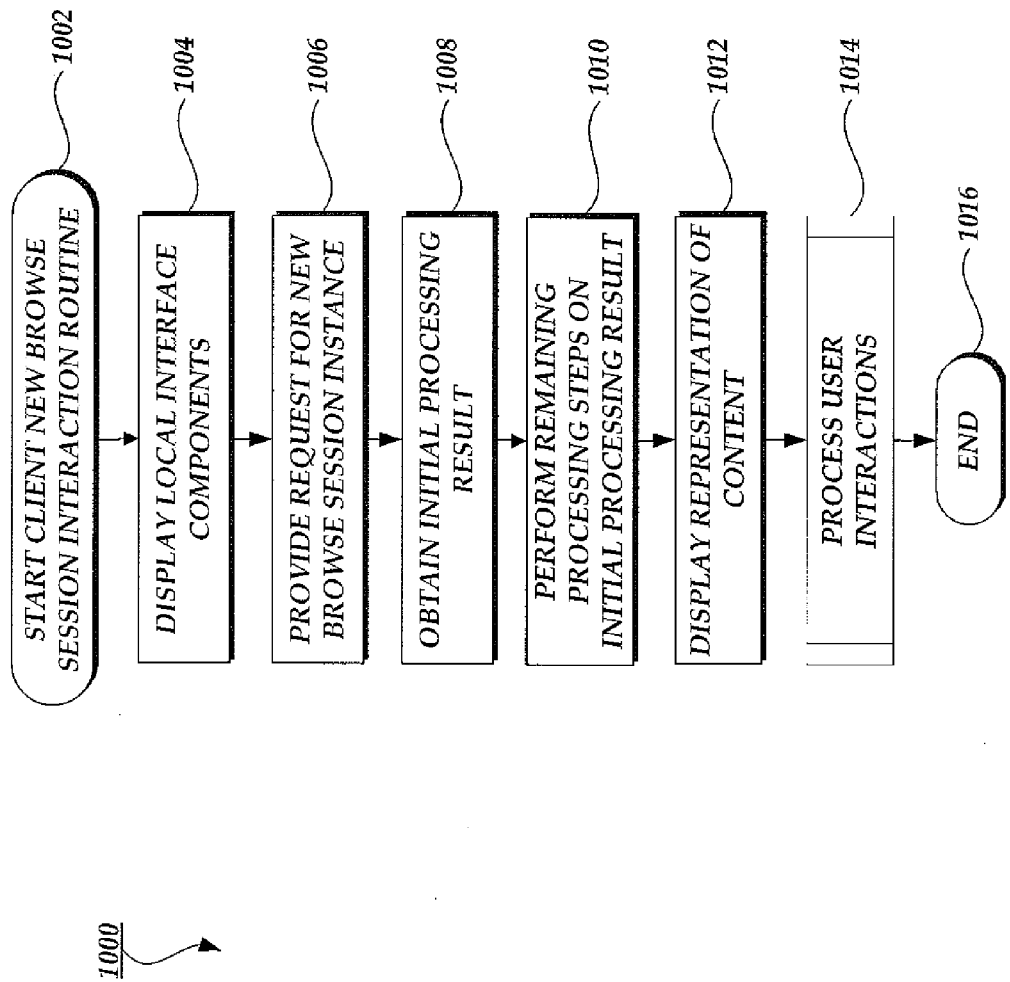
FIG. 10 is a flow diagram illustrative of a client new browse session interaction routine implemented by a client computing device.

FIG. 10 is a flow diagram illustrative of a client new browse session interaction routine 1000 implemented by client computing device 102. New browse session interaction routine 1000 begins at block 1002 in response to an event or user request causing the client computing device 102 to load a browser for viewing network content. At block 1004, the client computing device loads locally managed components of the browser, including all local interface components. As described above with reference to FIGS. 5 and 7, local interface components may include toolbars, menus, buttons, or other user interface controls managed and controlled by the software browser application or any other process executing or implemented locally at the client computing device. At block 1006, the client computing device 102 provides a request for a new browse session instance to the network computing provider 107. From the perspective of the user of the client computing device, the request for the new browse session corresponds to the intended request to transmit the request to one or more corresponding content providers 104. In other embodiment, the new session request may correspond to a request to load a file or other document (e.g., a request to load an image in a photo-editing application, etc.). Illustratively, the request may be generated automatically as a result of the browser loading (e.g., a request for a default or "home" page), or may be generated as a result of a user following a link or entering a network address into an address bar. As illustrated with respect to FIG. 2, the browse session request is transmitted first to a network computing provider 107. In an illustrative embodiment, the network computing provider 107 utilizes a registration API to accept browse session requests from the client computing device 102.

A browse session request may include any number of pieces of data or information including, but not limited to, information associated with a user, information associated with the client computing device 102 or software on the client computing device (e.g., hardware or software information, a device physical or logical location, etc.), information associated with the network 108, user or browser preferences (e.g., a requested remote session browse protocol, a preference list, a decision tree, or other information), information associated with the network computing provider 107, information associated with one or more pieces of requested network content (e.g., the network address of a network resource), etc. For example, a browse session request from the client computing device 102 may include information identifying a particular client computing device hardware specification or a hardware performance level, latency and bandwidth data associated with recent content requests, a desired security level for processing different types of content, a predetermined preference list of remote session browse protocols, and one or more network addresses corresponding to requested network resources, among others. In another example, the browse session request can include information identifying a client computing device 102 screen resolution, aspect ratio, or browser display area in the browse session request may allow the network computing provider 107 to customize the processing of network content for display on the client computing device. As previously described, the browse session request can include network address information corresponding to a requested network resource, which may be in any form including, but not limited to, an Internet Protocol ("IP") address, a URL, a Media Access Control ("MAC") address, etc. In one embodiment, the request for a new browse session instance may correspond to the network computing provider receiving a request for a new browse session instance at block 904 of FIG. 9 above.

At block 1008, the client computing device 102 obtains an initial processing result from the network computing provider 107. Illustratively, the format and data included in the initial processing result may vary based on the remote session browsing configuration selected by the network computing provider 107. In one embodiment, the initial processing result may include or be preceded by data informing the client computing device 102 of the choice of remote session browsing configuration and/or establishing a connection over the remote session communication protocol corresponding to the selected remote session browsing configuration. As discussed above with reference to FIGS. 8 and 9, the obtained initial processing result may include requested content with one or more processing actions performed by the network computing provider 107. Subsequent to obtaining the initial processing result, the client computing device 102 may perform any remaining processing actions on the initial processing result at block 1010.

At block 1012, the client computing device 102 displays the content corresponding to the processed initial processing result. For example, the client computing device 102 may display the processed client in the content display area 702 of a browser 700 as described in FIG. 7 above. In one embodiment, the processing result may only include display data corresponding to content displayed by a browser, and may not include display data corresponding to, for example, the interface controls of a browser instance at the NCC POP 142, the desktop of a virtual machine instance corresponding to the browse session, or any other user interface of the NCC POP 142. For example, the NCC POP 142 may process a Web page and associated content for display via RDP in a browser instance running in a virtual machine instance at the NCC POP 142. The browser instance may have one or more interface elements such as toolbars, menus, scroll bars, etc., in addition to the displayed Web page. The NCC POP 142 may send an RDP processing result corresponding to the displayed Web page only, without any of the interface elements associated with the browser. Illustratively, including an RDP processing result corresponding to the displayed Web page only may allow the browser at the client computing instance 102 to display the Web page by assembling the RDP processing result in the content display area of the browser without any further processing. In another embodiment, the RDP processing result may include a full virtual machine desktop and browser window corresponding to the full interface displayed at the NCC POP 142 browse session instance. The client computing device may automatically identify the area of the RDP processing result corresponding to the requested content, and may display only this area in the content display area of the browser.

At block 1014, the client computing device 102 processes local and remote user interactions. An illustrative routine for processing user interactions is provided below with reference to FIG. 11. At block 1016 the routine ends. Illustratively, a browse session instance instantiated by the network computing content provider 107 may terminate when a browser window or content display area is closed, may terminate when a remote session browse protocol is replaced by a parallel process at the client computing device 102, or may terminate in accordance with a timer or other event. Illustratively, if a browse session has terminated automatically due to a timeout but has associated content still displayed in a browser at the client computing device 102, later attempts by the user to interact with the content may result in a new browse session request being provided to the network computing and storage service provider 107 to start a new browse session according to the last state of the terminated session. Illustratively, terminating a remote browse session after a time-out may allow the network computing storage provider 107 to save computing resources at the NCC POP. In one embodiment, this process may be transparent to the user at client computing device 102, even though the remote browse session has been terminated during the intervening period.

Figure 11:
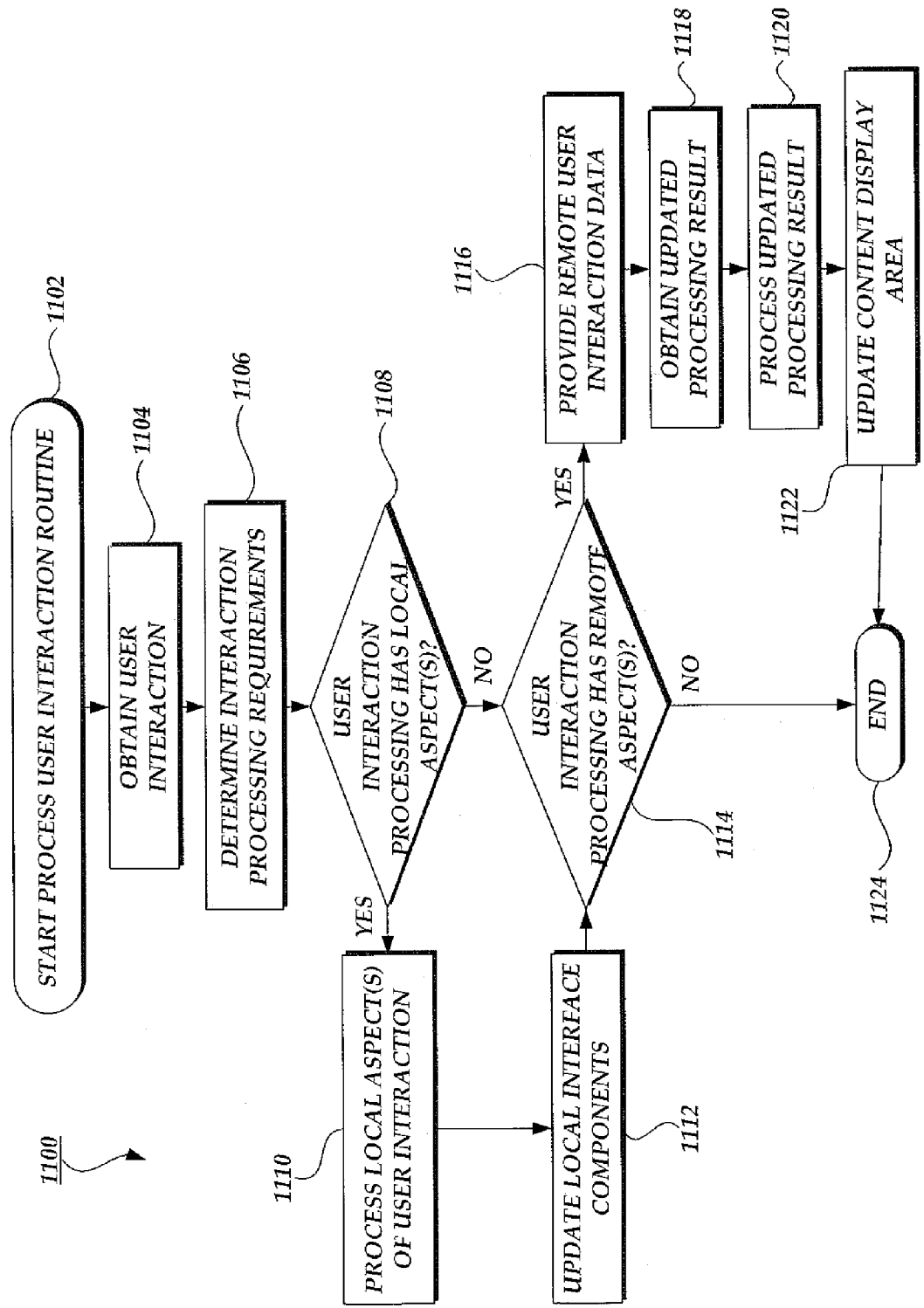
FIG. 11 is a flow diagram illustrative of a process user interaction routine implemented by a client computing device.

FIG. 11 is a flow diagram illustrative of a process user interaction routine 1100 implemented by a client computing device 102. Process user interaction routine 1100 begins at block 1102 in response to an interaction by a user. Illustratively, process user interaction routine 1100 may begin subsequent to the display of content in a content display area of a browser interface. For example, process user interaction routine 1100 may correspond to block 1014 of FIG. 10 above.

Illustratively, the displayed content may have one or more interactive elements, such as forms, buttons, animations, etc. User interaction with these interactive elements may require processing and display of updated content in the content display area. For example, selecting an element in a drop-down menu on a Web page may require processing and may change the configuration or visual appearance of the Web page or embedded resources. Illustratively, the processing required by user interaction with the displayed content may be handled as a local user interaction at the client computing device 102 or as a remote user interaction at the NCC POP 142 depending on the remote session browsing configuration in use. For example, if a remote session browsing configuration utilizing substantial local processing (e.g., sending unprocessed files over HTML), user interactions with displayed content may typically be handled as local user interactions at the client computing device 102. Illustratively, handling user interactions with displayed content as local user interactions at the client computing device 102 may allow for better responsiveness and fewer delays with simple user interactions (e.g., selection of a radio button, or typing text into a field), as interaction data corresponding to the interaction does not need to be sent to the NCC POP 142 for processing.

As a further example, if a remote session browsing configuration utilizing heavy remote processing of content (e.g., sending processed bitmap data over RDP) is being used as the remote session browsing configuration, all user interactions with displayed content may be handled as remote user interactions. For example, user input (e.g., keyboard inputs and cursor positions) may be encapsulated in RDP protocol data units and transmitted across network 108 to the NCC POP 142 for processing. Illustratively, the NCC POP 142 may apply the user interactions to the network content and transmit processing results consisting of updated bitmaps and interface data corresponding to an updated representation of the content back to the client computing device 102. Illustratively, handling user interactions with displayed content as remote user interactions at the NCC POP 142 may have a negative impact on interface responsiveness, as data is required to pass over the network and is limited by network latency; however, user interactions that require a substantial amount of processing may perform better when handled as remote user interactions, as the processing latency of the NCC POP 142 may be substantially lower than the processing latency of the client computing device 102.

In addition to a content display area for displaying network content, a browser may have one or more local interface components, such as toolbars, menus, buttons, or other user interface controls. Interactions with local interface components may be treated as local user interactions or remote user interactions depending on the processing required by the interaction and the remote session browsing configuration as further depicted in illustrative FIG. 7. For example, some local interface components may be managed locally by browser code running on the client computing device, while other local interface components may have one or more locally managed aspects (e.g., button click feedback, scroll bar redraw, etc), and one or more remote managed aspects treated as remote user interactions (e.g., page refresh, requesting a page at an address in an address bar, etc.)

At block 1104, the client computing device 102 obtains a user interaction from the user. This user interaction may be an interaction with local interface components as described in FIG. 7 and above, or may be an interaction with any interactive elements of the content displayed in the content display area of the browser, such as form fields, buttons, animations, etc. User interaction with these local interface components or interactive elements of displayed content may require local and/or remote processing depending on the nature of the component or element and the processing split specified by the remote session browsing configuration as described in FIG. 7 and above. At block 1106, the client computing device 102 determines the interaction processing requirements for the obtained user interaction. At decision block 1108, if the user interaction has local aspects (e.g., button click feedback, a change to a local browser state, a content element being processed at the client computing device, etc.) the routine 1102 moves to block 1110 to process the local aspect or aspects of the user interaction at the client computing device 102 and subsequently update the local interface components at block 1112. Illustratively, and as discussed above, aspects of the interaction and updating interface components and elements locally allows a browser to provide responsive user interfaces and content. Subsequent to processing local aspect(s) of the user interaction, or if the user interaction has no local elements (e.g., a user interaction with a content element displayed in the content display area when using a remote session browsing configuration processing entirely on the server side and utilizing an RDP remote session communication protocol) the routine 1102 moves to decision block 1114. If the user interaction has remote aspects that require processing, the routine 1102 moves to block 1116 and provides remote user interaction data to the network computing provider 107. Illustratively, in the case of a heavily server side remote session browsing configuration utilizing an RDP remote session communication protocol, the remote user interaction data may include input data such as a cursor position or keyboard input encapsulated in one or more RDP protocol data units. In some embodiments of remote session browsing configurations utilizing RDP or other remote session communication protocols, particular aspects of remote user interaction data such as cursor positions may be provided to the network computing provider 107 on a continuous basis, while in other embodiments of remote session browse configurations remote user interaction data may only be provided to the network computing provider 107 when associated with a user interaction that requires remote processing.

At block 1118, the client computing device 102 obtains an updated processing result from the network computing provider 107, the network computing provider 107 having processed the remote user interaction data to generate an updated representation of the content. At block 1120, the client computing device 102 performs any additional processing required on the updated processing result (based on the remote session browsing configuration) and at block 1122 displays the updated processing result in the content display area of the browser. At block 1124 the process user interaction routine 1102 ends. Illustratively, the routine may be executed again any number of times in response to further user interactions with the browser and displayed content.

Figure 12:
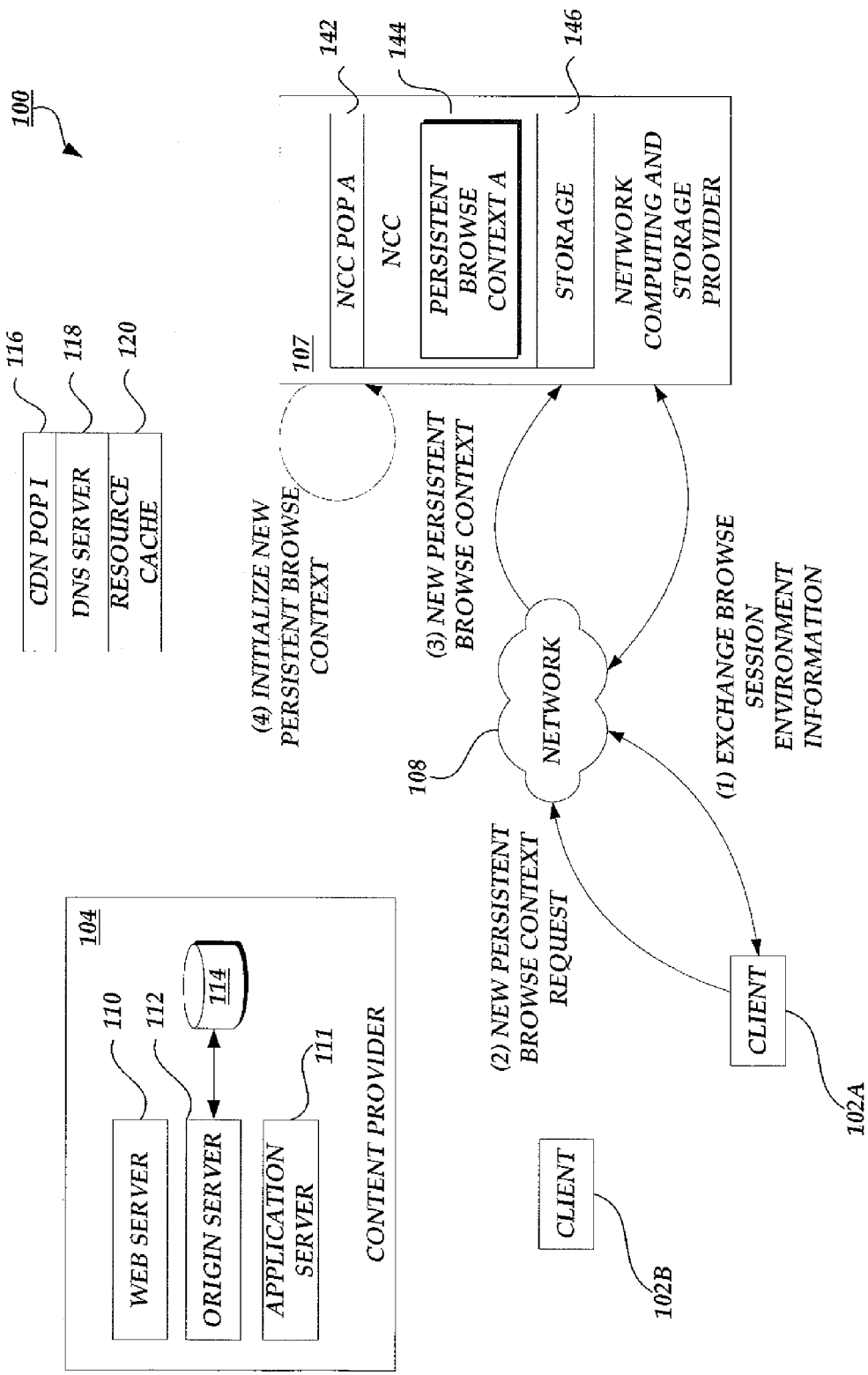
FIG. 12 is a block diagram of the content delivery environment of FIG. 1 illustrating the generation and processing of a new persistent browsing context request from a client computing device to a network computing provider.
Figure 13:
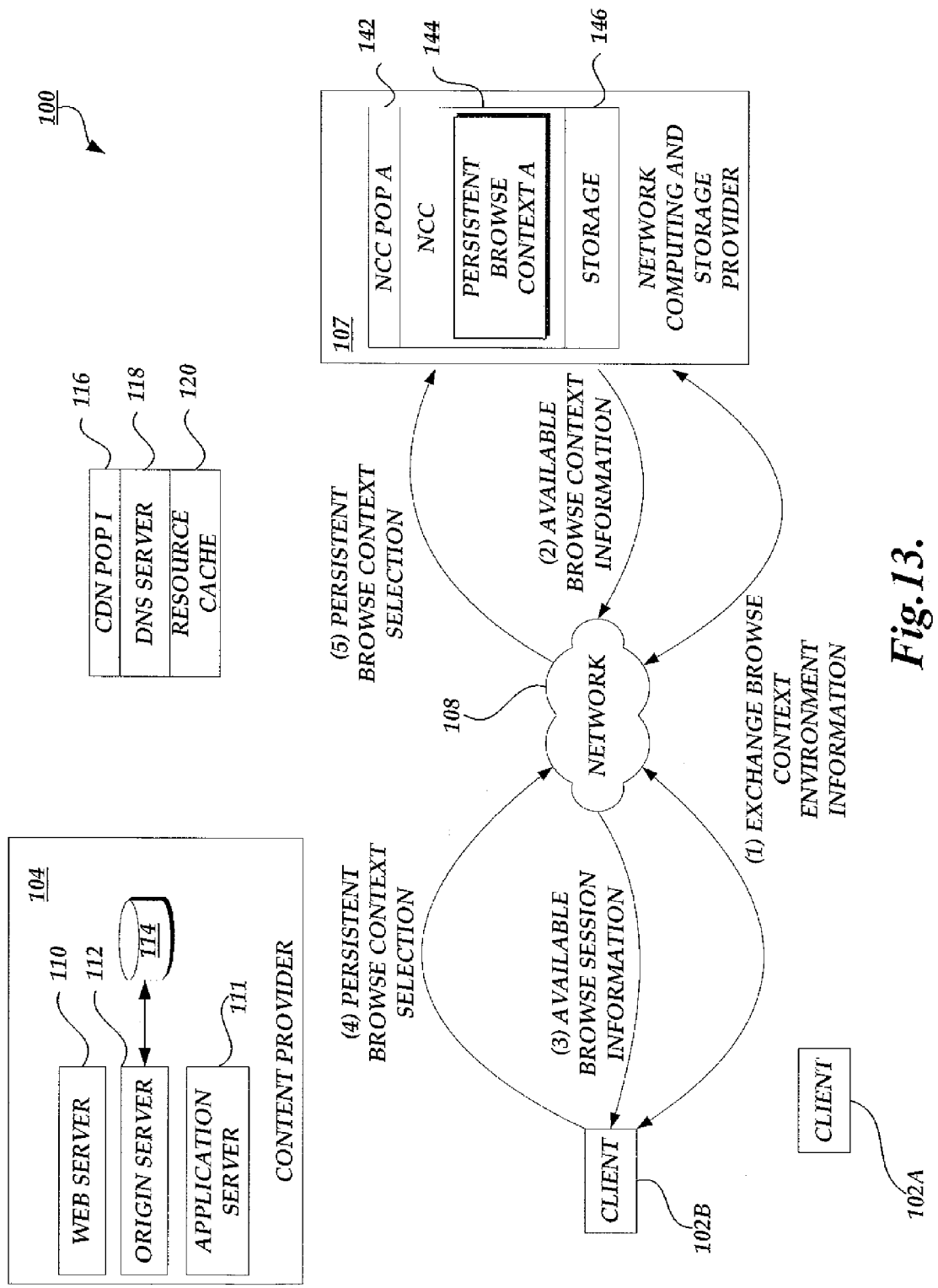
FIG. 13 is a block diagram of the content delivery environment of FIG. 1 illustrating the generation and processing of a request to access an existing persistent browsing context from a client computing device to a network computing provider.
Figure 14:
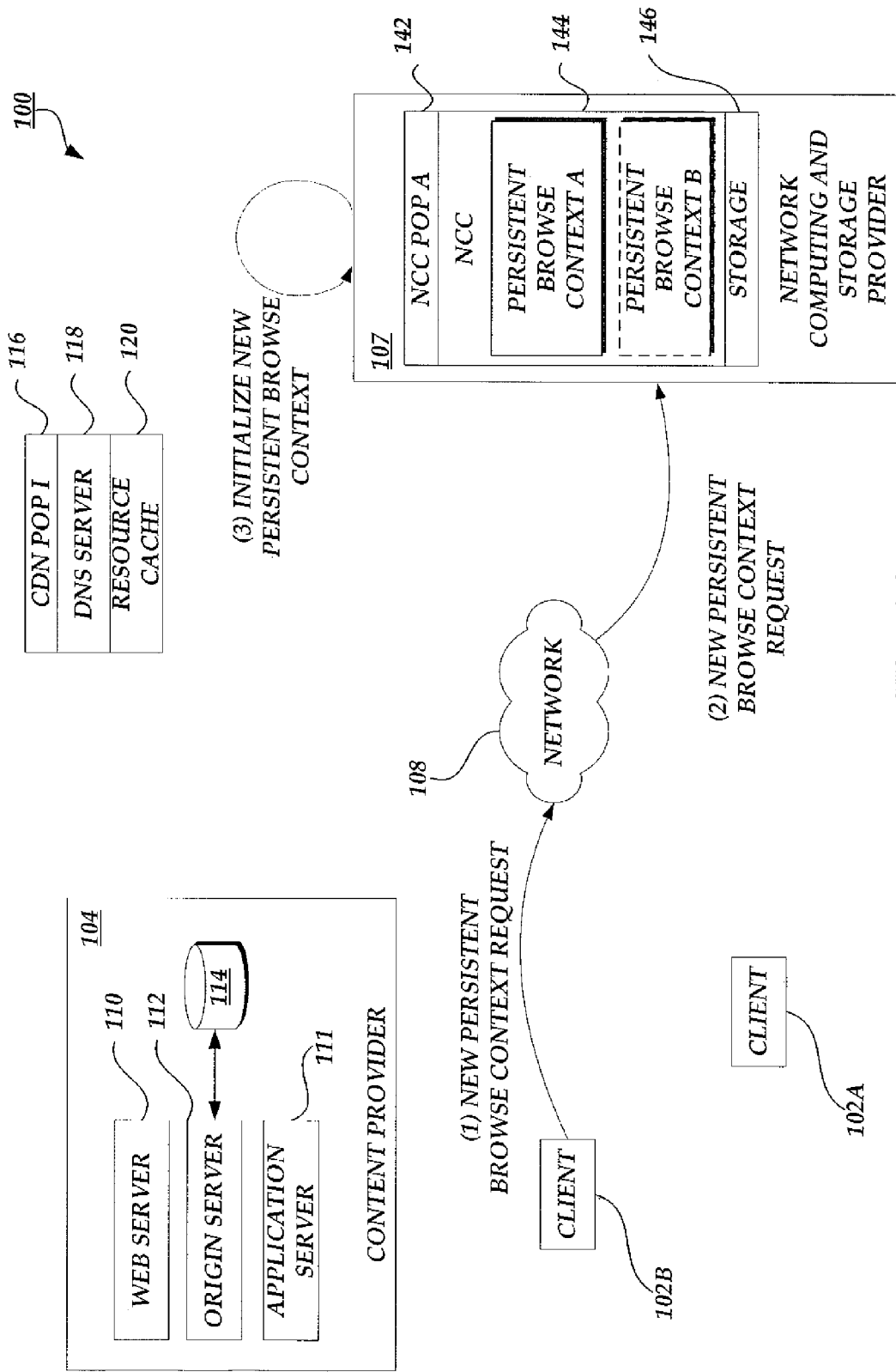
FIG. 14 is a block diagram of the content delivery environment of FIG. 1 illustrating the generation and processing of an additional new persistent browsing context request from a client computing device to a network computing provider.

With reference now to FIGS. 12-14, the interaction between various components of the networked computing environment 100 of FIG. 1 will be illustrated. Specifically, FIGS. 12-14 illustrate the interaction between various components of the networked computing environment 100 for the creation and maintenance of one or more persistent browsing contexts at the network computing provider 107. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

With reference to FIG. 2, the process can begin with the generation and processing of a new persistent browsing context request from a client computing device 102A to a network computing provider 107. Illustratively, the client computing device 102A may load a browser for viewing network content in response to an event or user request. Subsequent to the browser being loaded, the browser may be configured to request a new persistent browsing context. In various embodiments, the request for a new persistent browsing context may be automatic upon browser load, or may be the result of an event such as a command or request from the user of the client computing device. In other embodiments, the browser may be configured to request access to an existing persistent browsing context instantiated at the network computing provider as discussed in FIG. 4 below.

As illustrated in FIG. 12, the client computing device 102A and a network computing provider 107 may exchange of persistent browsing context environment information. Illustratively, persistent browsing context environment information may include any number of types of information including, but not limited to configuration information, identifying information, browse preference information, information regarding currently active persistent browsing contexts, etc. In other embodiments, persistent browsing context environment information may be included in a persistent browsing context request, or may be exchanged prior, subsequently, or simultaneously to a persistent browsing context request.

Client computing device 102A may send a persistent browsing context request to the network computing provider 107. In an illustrative embodiment, the network computing provider 107 utilizes a registration application program interface ("API") to accept persistent browsing context requests from the client computing device 102. In one embodiment, the persistent browsing context request can include a browse session request or other information identifying requested content as described in FIGS. 2-6 above.

Subsequent to the receipt of the persistent browsing context request, the network computing provider 107 may select an NCC POP such as NCC POP 142 to service the persistent browsing context request. The selection of processing and network resources and the provisioning of software at the NCC POP instance may be done, at least in part, in order to optimize communication with content providers 104 and client computing devices 102, for example as based on location or performance information included in the persistent browsing context environment information or persistent browsing context request.

The selected NCC POP 142 may generate a persistent browsing context corresponding based on the persistent browsing context request and any persistent browsing context environment information exchanged between client computing device 102A and network computing provider 107. Illustratively, instantiating a new persistent browsing context instance may include loading a new virtual machine instance and/or browser instance at the NCC POP 142, reserving or allocating device memory, storage or cache space, processor time, network bandwidth, or other computational or network resources for the new persistent browsing context.

Although not shown here for purposes of clarity, subsequent to a new persistent browsing context being instantiated at NCC POP 142, the client computing device 102A may provide NCC POP 142 with requests for new browse sessions or other requests corresponding to requested content. NCC POP 142 may create any number of new browse sessions corresponding to the new browse session requests and/or content requests and exchange various browse session information with the client computing device 102A. For example, the NCC POP 142 may provide initial processing results to the client computing device 102A, and exchange user interaction data and updated processing results with the client computing device 102A as described in FIGS. 2-6 above. The NCC POP 142 may additionally receive browser and content configuration data corresponding to changes in the state, configuration, or preferences of the browser and the display of content therein. The NCC POP 142 may process configuration data and browse session information, and may maintain the content and state information in the persistent browsing context. Illustratively, new browse sessions corresponding to requested content may be instantiated at the same NCC POP 142 as the persistent browsing context, or may be instantiated at any other NCC POP based on any number of performance, cost, or preference factors as discussed above with reference to FIG. 11. In various embodiments, a browse session may be created for each piece of content, tab, window, frame, group of content, or any combination thereof associated with the persistent browsing context. Illustratively, each browse session may be associated with the same or a different remote session browse configuration as described with reference to FIGS. 8-10 above.

With reference to FIG. 11, a block diagram of the content delivery environment of FIG. 1 illustrating the generation and processing of a request to access an existing persistent browsing context from a client computing device 102B to a network computing provider 107 is disclosed. As illustrated in FIG. 11, a second client computing device 102B may attempt to access an existing persistent browsing context request at network computing provider 107 across network 108. In an illustrative embodiment, the network computing provider 107 utilizes a registration API to accept persistent browsing context requests and persistent browsing context environment information from the client computing device 102B.

Illustratively, subsequent to the creation of a new persistent browsing context as described above with reference to FIG. 12, a user of a client computing device 102A may stop interacting with the displayed content or may otherwise exit the browser running at the client computing device 102A. For example, the user may close the software browser application running at the client computing device 102A, may power off the client computing device 102A, or may simply become engaged in an alternate activity. In one embodiment, the NCC POP 142 may maintain a software browser application associated with the persistent browsing context even after a connection to a client computing device 102A is lost. In other embodiments, the NCC POP 142 may store data associated with a current state of the persistent browsing context, including content display data, content or session state data, browser configuration or state data, etc.

The user of the client computing device 102A may subsequently decide to return to the earlier persistent browsing context. Illustratively, the user of the client computing device 102A may choose to access the earlier persistent browsing context through a second client computing device 102B, which may have different hardware, software, or network access from the client computing device 102A. Although the client computing device 102B is described here as a second client computing device for the purposes of example, it should be understood that all descriptions in this figure may be applied to a subsequent access of a persistent browsing context by the original client computing device 102A. Additionally, although for the purposes of example the user of client computing device 102B is described as the same as the client computing device 102A, it should be understood that, in various embodiments, an existing persistent browsing context may be accessed by any party, and may be accessed on the basis of any type of identifying information including browser information, user information (e.g., an ID, login, or password), device information, an environment identifier, a persistent browsing context identifier, etc.

The request to access a persistent browsing context may begin with the exchange of persistent browsing context environment information as described with reference to FIG. 12 above. The exchange of persistent browsing context information may be initiated by a client computing device 102B in response to a user opening up a new browser window with a new content display area, opening a new content display area in an existing browser window (e.g., opening a new tab in a browser), requesting new network content in an existing content display area (e.g., following a link to a new network resource, or entering a new network address into the browser), or any other user interaction. In one embodiment, persistent browsing context environment information provided by the client computing device 102B to the network computing provider 107 may include, but is not limited to, browser information, user information (e.g., an ID, login, or password), device information, an environment identifier, a persistent browsing context identifier, etc. Responsive to this identification information, the network computing provider 107 may provide the client computing device with available session information including a list of available persistent browsing contexts associated with the identification information. Illustratively, the list of available persistent browsing contexts may correspond to active software processes or stored data on the NCC POP 142, or any other combination of NCC POPs or network computing or storage devices associated with the network computing provider 107.

The client computing device 102B may select an existing persistent browsing context from the list of available persistent browsing contexts provided by the network computing provider 107, and may transmit the persistent browsing context selection to the network computing provider 107. An illustrative user interface for selection an existing persistent browsing context is provided with reference to FIG. 15 below. Although not depicted here for the purposes of clarity, upon receiving the persistent browsing context selection, the network computing provider 107 may cause the client computing device 102B to be connected to an existing persistent browsing context at NCC POP 142. In one embodiment, this may include accessing a currently running software browser application or initializing a new software browser application at an NCC POP 142 based on previously stored persistent browsing context information such content, content states, and/or browser states. The NCC POP 142 may create new browse sessions or access existing browse sessions corresponding to content associated with the persistent browsing context, and may transmit initial processing results corresponding to present states of the content associated with the persistent browsing context and a present state of the browser associated with the persistent browsing context. The client computing device 102B and the NCC POP 142 may proceed to exchange user interaction data, content requests, processing results, and browser configuration information for example as described with regards to FIGS. 2-6 and 12 above.

With reference to FIG. 14, a block diagram of the content delivery environment of FIG. 1 illustrating the generation and processing of an additional new persistent browsing context request from a client computing device 102B to a network computing provider 107 is disclosed. Illustratively, the client computing device 102B may request a new persistent browsing context in response to a user opening up a new browser window with a new content display area, opening a new content display area in an existing browser window (e.g., opening a new tab in a browser), requesting new network content in an existing content display area (e.g., following a link to a new network resource, or entering a new network address into the browser), or any other user interaction.

In one embodiment, if a connection to a first persistent browsing context has already been established, the client computing device 102B and the network computing provider 107 may not exchange persistent browsing context environment information as described with reference to FIG. 12. As described above with regard to FIG. 12, subsequent to the request for the new persistent browsing context, the network computing provider 107 may cause an instantiation of a virtual machine, data store, and/or software browser application at an NCC POP 142 for maintaining state and content associated with a new persistent browsing context. As discussed above with reference to FIG. 12, a network computing provider 107 may select an NCC POP to service a persistent browsing context request based on any number of factors, including, but not limited to available NCC POP resources (e.g., available memory, processor load, network load, etc), a financial cost of servicing the persistent browsing context request at the NCC POP, the NCC POP location respective to a client computing device 102, content provider 112, or CDN POP 116, a NCC POP cache status (e.g., whether requested content is already stored in an NCC POP cache), etc. Illustratively, although the network computing provider 107 is depicted here for purposes of illustration as selecting NCC POP 142, the network computing provider 107 may select any extant NCC POP to service the persistent browsing context request. As discussed above, the decision whether to select a different NCC POP than was utilized for a previous or simultaneous persistent browsing context may be made on the basis of available system resources, randomly, or according to any other factor as discussed above and with regards to FIG. 12. Illustratively, once the new persistent browsing context has been established, the client computing device 102B and the NCC POP 142 may proceed to establish browse sessions and exchange user interaction data, content requests, processing results, and browser configuration information, for example as described with regards to FIG. 12 above.

Figure 15:
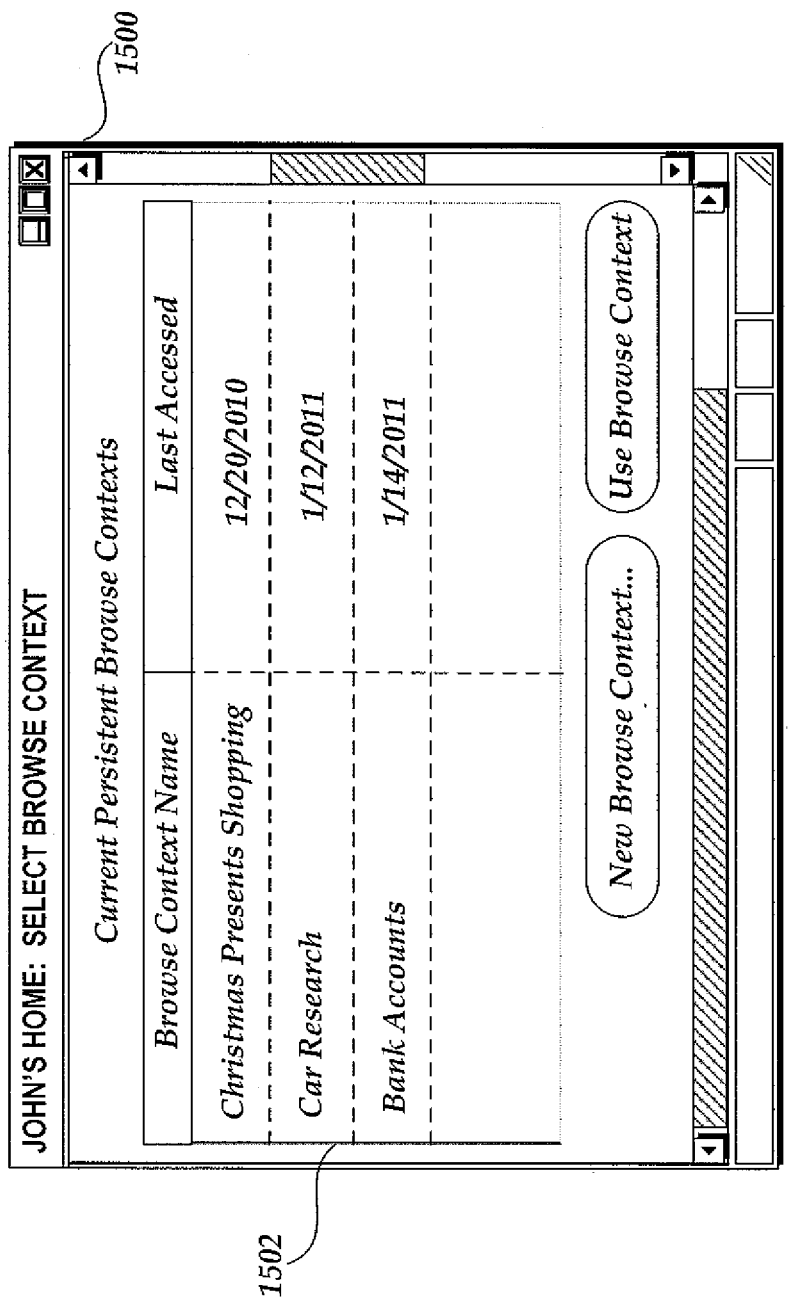
FIG. 15 is a user interface diagram depicting an illustrative browsing context selection interface.

FIG. 15 is a user interface diagram depicting an illustrative persistent browsing context selection interface 1500. As described with reference to FIGS. 13 and 16, after a client computing device provides identifying information to a network computing provider 107, the network computing provider 107 may provide the client computing device 102 with a list of available persistent browsing contexts 1502 based on identification information. For example, a client computing device 102 may provide browse environment identification information in response to a user opening a browser application or otherwise identifying a browse environment to access. In another example, a client computing device 102 may provide user identification information such as a login or a password to the network computing provider 107. The network computing provider 107 may respond to this identification information by providing a list of available persistent browsing contexts 1502 to the client computing device 102. In one embodiment, the list of available persistent browsing contexts 1502 may be presented to the user in a persistent browsing context selection interface 1500 identifying the persistent browsing context environment (e.g., "John's Home") based on identification information as discussed above. Illustratively, a persistent browsing context selection interface 1500 may provide the list of available persistent browsing contexts 1502 along with accompanying information such as a last persistent browsing context access date, etc. In one embodiment, the persistent browsing context selection interface 1500 may allow a user to create a new persistent browsing context as well as access an existing persistent browsing context, as described with reference to FIG. 12 and FIG. 13, respectively.

Figure 16:
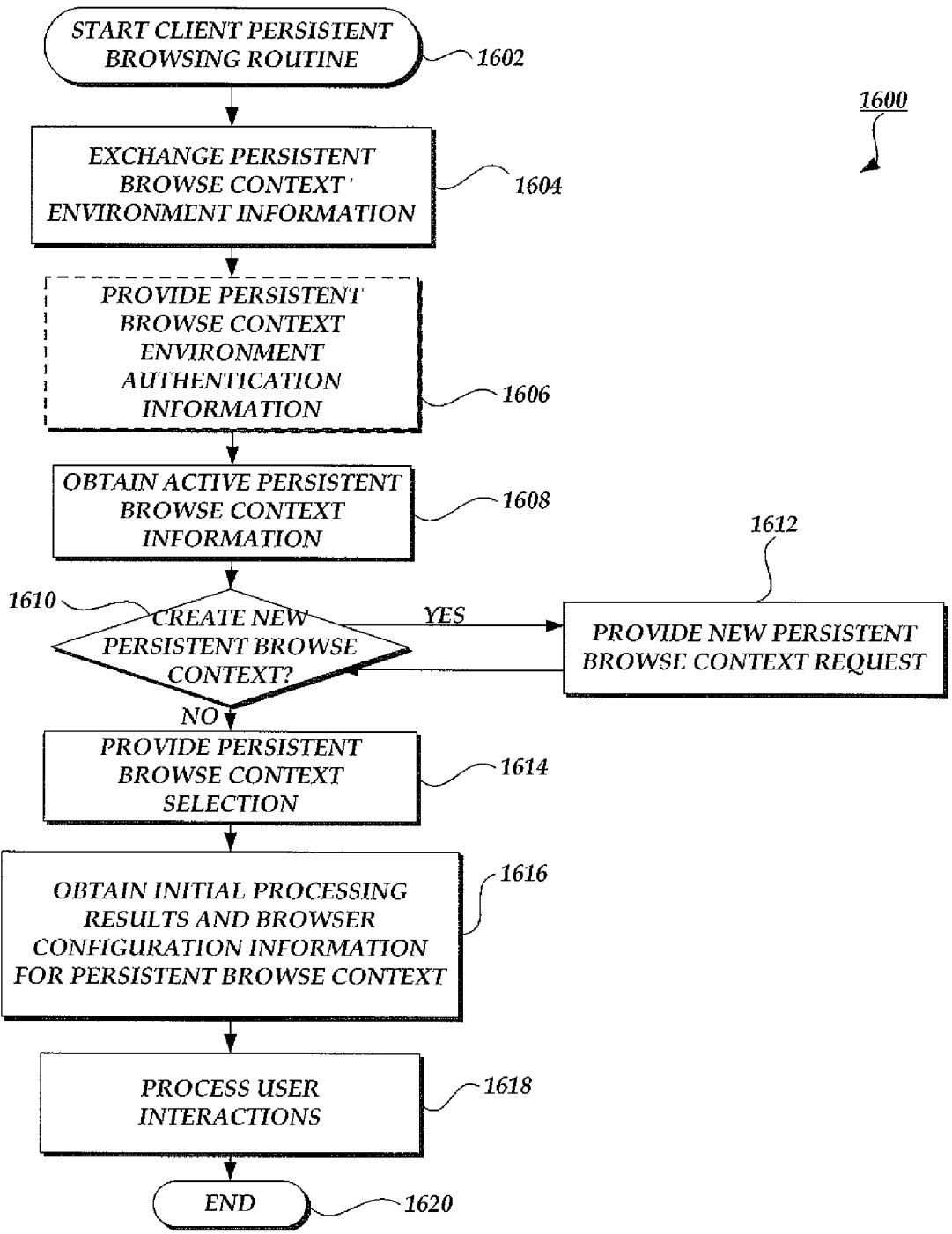
FIG. 16 is a flow diagram illustrative of a client persistent browsing routine implemented by a client computing device.

FIG. 16 is a flow diagram illustrative of a client persistent browsing routine implemented by a client computing device 102 of FIG. 1. Client persistent browsing routine 1600 begins at block 1602. Illustratively, client persistent browsing routine 1600 may begin in response to a new instance of a software browser application being instantiated at the client computing device 102, a user requesting access to a persistent browsing context from a previously instantiated software browser application at the client computing device 102, or any other event.

At block 1604, the client computing device 102 establishes a connection and exchanges persistent browsing context environment information with a network computing provider 107. Illustratively, persistent browsing context environment information may include any number of types of information including, but not limited to, configuration information, identifying information, browse preference information, information regarding currently active persistent browsing contexts, etc. For example, the client computing device 102 may transmit persistent browsing context environment information including device information, software browser information, location information, a user id or other user information, a persistent browsing context environment identifier, information specifying a previous browse history or set of bookmarks to utilize within the persistent browsing context, or any other type of information. Specifically, for the purposes of illustration, the persistent browsing context environment information sent to the network computing provider 107 by the client computing device 102 may include, but is not limited to, hardware and software information associated with the client computing device 102, information identifying a user (e.g., a login and password, a user id, etc.), information associated with the user, a persistent browsing context identifier, browser configurations or preferences, a logical or physical device location, etc.

In one embodiment, the persistent browsing context environment information may include a persistent browsing context environment identifier associated with a set of existing persistent browsing contexts or persistent browsing context preferences stored at the network computing provider. For example, a user at client computing device 102 may choose to access a persistent browsing context environment named "John's House." With regards to this specific example, the client computing device 102 may provide a persistent browsing context environment identifier associated with the "John's House" persistent browsing context environment to the network computing provider 107 as part of the browse environment information. Illustratively, the "John's House" browse environment identifier may be associated with a number of different persistent browsing contexts at the network computing provider 107, as discussed below, and may further be associated with preferences or configuration information common to the associated persistent browsing contexts, such as sets of bookmarks or browsing history. In various other embodiments, persistent browsing contexts and various preferences or configuration information may be associated with identification information corresponding to a user, a client computing device 102, a logical or physical location, a software browser application, operating system, or other software, a network address, device performance or network characteristics, or any other entity, device, or piece of information. In other embodiments, persistent browsing context environment information may be included in the persistent browsing context request, or may be exchanged prior or simultaneously to the new persistent browsing context request. In various embodiments, persistent browsing context environment information may additionally or alternatively include a persistent browsing context identifier identifying a particular extant persistent browsing context.

Illustratively, in some embodiments, a browse environment identifier may be implemented in a computer or human readable format, such as an alphanumeric string consisting of letters, numbers, or other characters, and/or coded into a barcode, radio frequency id transmitter or any other code or transmission format. Illustratively, a client computing device 102 may be configured to read a browse environment identifier and utilize the browse environment identifier to identify sets of persistent browsing contexts and related configuration information at a network computing provider 107. For the purpose of a specific example, a first user may obtain a browse resource identifier, or an electronic address (e.g., a uniform resource locator (URL)) including information corresponding to the address of a network computing provider along with a browse environment identifier. Illustratively, this electronic address or browse environment identifier may in various embodiments be generated by the browser at the client computing device 102, the network computing and storage component 107, the first user, or any other service, entity, or device. The first user may provide the electronic address to a second user (e.g., by electronic message). The second user may provide the electronic address to the network computing provider 102 through a browser running on a client computing device 102 associated with the second user in order to access the persistent browsing contexts and corresponding configuration information associated with the browse environment identifier. For example, the electronic address may in one embodiment be presented as a hyperlink containing an address of the network computing provider 107 and the browse environment identifier, and the second user may cause the browse environment identifier to be transmitted to the network computing provider 107 by clicking on or otherwise following the link. In various other embodiments, a persistent browsing context identifier may be transferred between or read by client computing devices utilizing any other technology as known in the art, including, but not limited to, QR codes, bar codes, radio frequency id codes, near field communication, Bluetooth, infrared, etc. Illustratively, in other embodiments, identifiers identifying a particular extant persistent browsing context at a network computing provider 107 may be transmitted using any of the same methodologies as described above with reference to browse environment identifiers.

The network computing provider 107 may respond to the persistent browsing context information from the client with a list of available existing persistent browsing contexts associated with the specified device/user/environment identifier, configuration information for the browser running at the client computing device, bookmarks or browsing history to associate with the software browser for the persistent browsing context, etc. In one embodiment, at block 1606, the client computing device may provide persistent browsing context environment authentication information to the network computing provider 107. For example, in response to identification information received from the client computing device 102 (e.g., a persistent browsing context environment identifier, user, device, or browser identification information, etc.), the network computing provider 107 may require additional authentication information such as a login and/or password. Illustratively, this authentication information may be requested or provided over a secure connection utilizing any protocol or technology as known in the art.

At block 1608, the client computing device 102 obtains current active persistent browsing context information such as a list of currently active persistent browsing contexts associated with one or more aspects of the identification information exchanged at block 1604 above. Illustratively, the current active persistent browsing context information may include various information regarding one or more of the persistent browsing contexts in the list including, but not limited to, persistent browsing context names or identifiers, persistent browsing context last accessed dates, persistent browsing context total time spent browsing, persistent browsing context creation dates, tags or other persistent browsing context category information, lists of content associated with each persistent browsing context, user generated notes, device or browser access records, or any other historical or identifying information. In some embodiments, block 1608 may not occur, may be combined with another block, or may occur later or earlier than depicted in the routine 1600. For example, block 1608 may not be necessary if the client computing device has specified a particular persistent browsing context to join as part of the persistent browsing context environment information, there are no currently active persistent browsing contexts associated with one or more aspects of the identification information, etc.

At decision block 1610, the client computing device 102 may provide a new persistent browsing context request to the network computing provider 107 at block 1612 as described in FIGS. 12 and 14 above, or may identify a currently active persistent browsing context to access at decision block 1614. At block 1612, providing a new persistent browsing context request to the network computing provider 107 may cause the network computing provider 107 to instantiate a new persistent browsing context corresponding to the request. Illustratively, in one embodiment, the new persistent browsing context request may include one or more addresses or references to various network resources or other content requested by the client computing device 102. In a further embodiment, the persistent browsing context request may include association information associating the new persistent browsing context with one or more aspects of identification information included in the persistent browsing context environment information as described above with reference to block 1604. In an illustrative embodiment, the persistent browsing context request is transmitted in accordance with an API. Subsequent to providing the new browse request to the network computing provider 107, the client computing device 102 may provide persistent browsing context selection information selecting the new persistent browsing context to the network computing provider 107. In some embodiments, the routine 1600 will proceed directly to block 1616 without providing further selection information.

At block 1614 the client computing device 102 may select an existing persistent browsing context. Illustratively, the client computing device 102 may provide persistent browsing context selection information to the network computing provider 107. In one embodiment, the persistent browsing context selection information may correspond to one or more active persistent browsing contexts included in the current active persistent browsing context information provided to the client computing device 102 at block 1608. Illustratively, the routine 1600 may skip this block, for example if a new persistent browsing context was created, or if a particular extant persistent browsing context was already identified in the persistent browsing context environment information exchanged at block 1604 above.

At block 1616, the client computing device 102 may obtain one or more initial processing results from the network computing provider 107 corresponding to the content of the persistent browsing context selected at block 1614 above. The initial processing results may correspond to browse sessions associated with the persistent browsing context and instantiated at one or more NCC POP associated with the network computing provider 107 as described with reference to FIGS. 9-11 above. The initial processing results may be associated with representations of the content associated with the persistent browsing context. For example, in the case of a new persistent browsing context, the initial processing results may be associated with representations of content requested in association with the new persistent browsing context. In the case of an existing persistent browsing context, the initial processing results may be associated with representations of content associated with the existing persistent browsing context, such as, for example, Web pages corresponding with open tabs associated with the persistent browsing context. Illustratively, representations of content associated with an existing persistent browsing context may include the prior state of the content (i.e., the state of the content as of the last access of the persistent browsing context). For example, a user of a client computing device 102 accessing a persistent browsing context at the network computing provider 107 may have opened several Web pages in different tabs in a browser at the client computing device 102. The user may further have scrolled down through the Web page content in a first Web page and entered Web form data on a second Web page before closing the browser at the client computing device 102. With regards to this specific example, a browser at a client computing device 102 accessing the associated persistent browsing context at network computing provider 107 may receive processing results corresponding to representations of the Web pages as they were displayed before the browser was closed. For the purposes of example, the processing results may thus correspond to the displayed section of the scrolled down Web page, and correspond to the second Web page with form data intact, as well as any other representations of content as it was displayed before the browser was closed at the client computing device 102. Illustratively, the format and data included in the initial processing results may vary based on the remote session browsing configuration selected by the network computing provider 107 as discussed above with reference to FIGS. 9-11. A client computing device 102 accessing the persistent browsing context may further receive browser configuration information corresponding to a browser state before the original browser was closed, including, but not limited to a layout of interface elements in the browser, viewing state or style (e.g., displaying content in tabs, windows, or frames, and how many to display of each) a browser theme or visual skin, browser preferences, browser history, extant cookies or other identifying information, bookmarks, and any other configuration, setting, or information associated with the browser.

In one embodiment, the initial processing results received from the network computing provider 107 and associated with a persistent browsing context may correspond to a number of different resources or content (e.g., a number of Web pages). As described above with reference to FIG. 7, resources may be presented in different tabs in a browser interface at client computing device 102, or may be presented as a series of windows, as frames in a single window, as elements in a list, or in any other visual or organizational representation. Illustratively, if the visual or organization representation of the resources is such that one resource will be displayed initially, that is, prior to the display of the other resources (e.g., the currently open tab in a tab-organized browser such as that shown in FIG. 7 above), processing results corresponding to representations of this resource may be given processing or transfer priority at the client computing device 102 and/or at the network computing provider 107. For example, the client computing device 102 may perform any required processing steps on processing results corresponding to the initially-displayed resources before performing processing steps on processing results corresponding to resources that will be hidden by the browser interface (e.g., resources in tabs currently not displayed). As another example, the network computing provider 107 may prioritize one or more browse sessions associated with the initially-displayed resources. Illustratively, prioritizing may include processing results corresponding to initially-displayed resources before sending processing results corresponding to other resources. In other embodiments, the processing and/or transfer of processing results may be prioritized based on other factors including tags generated by a user or browser, a type of content, tags in resource code (e.g., HTML tags or metadata), a content importance, hardware or network specifications or requirements, or any other factor.

At block 1618, the client computing device 102 may process persistent browsing context user interactions, including providing user interaction data or new resource requests to network computing provider 107. The persistent browsing context user interactions correspond to processing, and receiving processing results related to representations of the interacted-with or requested content as described above with reference to FIG. 11. A number of illustrative embodiments related to the processing of persistent browsing context user interactions are described below. However, such embodiments should be not be considered to be limiting or imply required order or combination of embodiments.

In one aspect, the client computing device 102 may duplicate existing persistent browsing contexts by providing a persistent browsing context duplication request to the network computing provider 107. Illustratively, the network computing provider 107 may process the persistent browsing context duplication request and instantiate a new persistent browsing context at the network computing provider with identical content and state to the original persistent browsing context. In one embodiment, a persistent browsing context duplication request may be generated by a browser accessing an existing persistent browsing context. For example, a user may access an existing persistent browsing context from a new client computing device 102 or via a client computing device 102 that was previously utilized by the user. The network computing provider 107 may duplicate the existing persistent browsing context and provide the user with representations of the original content associated with the existing persistent browsing context and now associated with the duplicate persistent browsing context. For the purposes of this example, the user may interact with the representations of content associated with the duplicate persistent browsing context at the new client computing device, which may change the content or content states associated with the duplicate persistent browsing context.

At a subsequent point in time, the user may once again access the original existing persistent browsing context. Illustratively, the network computing provider 107 may provide the user with representations of the original content and content states associated with existing persistent browsing context, and not representations of content or content states associated with the duplicate persistent browsing context. Alternatively, the user may wish to continue access the subsequently modified duplicate persistent browsing context.

In another aspect, if the original persistent browsing context was associated with any particular persistent browsing context environment information (e.g., a browse environment identifier or other identification information), the newly instantiated duplicate persistent browsing context may be associated with the same persistent browsing context environment information or may be created as unassociated with any particular information. The duplicated persistent browsing context may be instantiated on the same NCC POP 142 as the original persistent browsing context, or may instantiated on any other NCC POP associated with the network computing provider.

In a further aspect, a client computing device 102 may import or export content and/or preferences between persistent browsing contexts. For example, a client computing device 102 may provide an import content request to a network computing provider 107. In one embodiment, the import content request may include one or more content identifiers in a current persistent browsing context and a persistent browsing context identifier to import to. As a specific example, the import content request may include identifiers of two tabs corresponding to Web pages displayed in the current persistent browsing context. The network computing provider 107 may add these tabs to the specified extant persistent browsing context. In various embodiments, these tabs may be removed from or kept in the current persistent browsing context, and may be added to the specified persistent browsing context with or without any content state information (e.g., entered form data or state, etc.) associated with the content in the current persistent browsing context. In another embodiment, the client computing device 102 may provide an import browser configuration request to the network computing provider 107. Illustratively, an import browser configuration request may specify one or more aspects of a configuration of a browser accessing the current persistent browsing context (e.g., bookmarks, history, visual preferences, etc.), and may cause the network computing provider 107 to add the specified configuration to another specified extant persistent browsing context. In one embodiment, the specified configuration may replace any existing configuration in the specified browser.

In still another aspect, a client computing device 102 may associate an existing persistent browsing context with identifying information (e.g., a browse environment identifier, a user id, a browser identifier, etc.), as discussed above with reference to the exchange of persistent browsing context environment information in block 1604. For example, the client computing device 102 may provide an associate browsing session request to the network computing provider 107, which may specify particular identifying information with which to associate the current browsing session. A client computing device 102 may further send requests to the network computing provider 107 to associate a persistent browsing context with a new identifier (e.g., a new persistent browsing context identifier, or browse environment identifier). In one embodiment, a client computing device 102 may further send requests to the network computing provider 107 to associate a particular browser or client computing device configuration with a particular identifier or piece of identifying information. Illustratively, in one embodiment, all persistent browsing contexts associated with a particular identifier or piece of identifying information may share one or more aspects of a browser or client computing device configuration. For example, all persistent browsing contexts associated with a particular browse environment identifier may share browser configuration information including, but not limited to, a set of bookmarks or browser history.

Returning to FIG. 16, at block 1620 the routine 1600 ends. In one embodiment, this may correspond to the user of the client computing device 102 ending his interaction with the persistent browsing context. Illustratively, the same or a different client computing device 102 may request access to and interact with the persistent browsing context at a later point in time through the same routine 1600. As discussed above, any number of different client computing devices 102 or users may access any number of persistent browsing contexts. Further, one or more client computing devices 102 or users may access a persistent browsing context any number of times after it is created.

Figure 17:
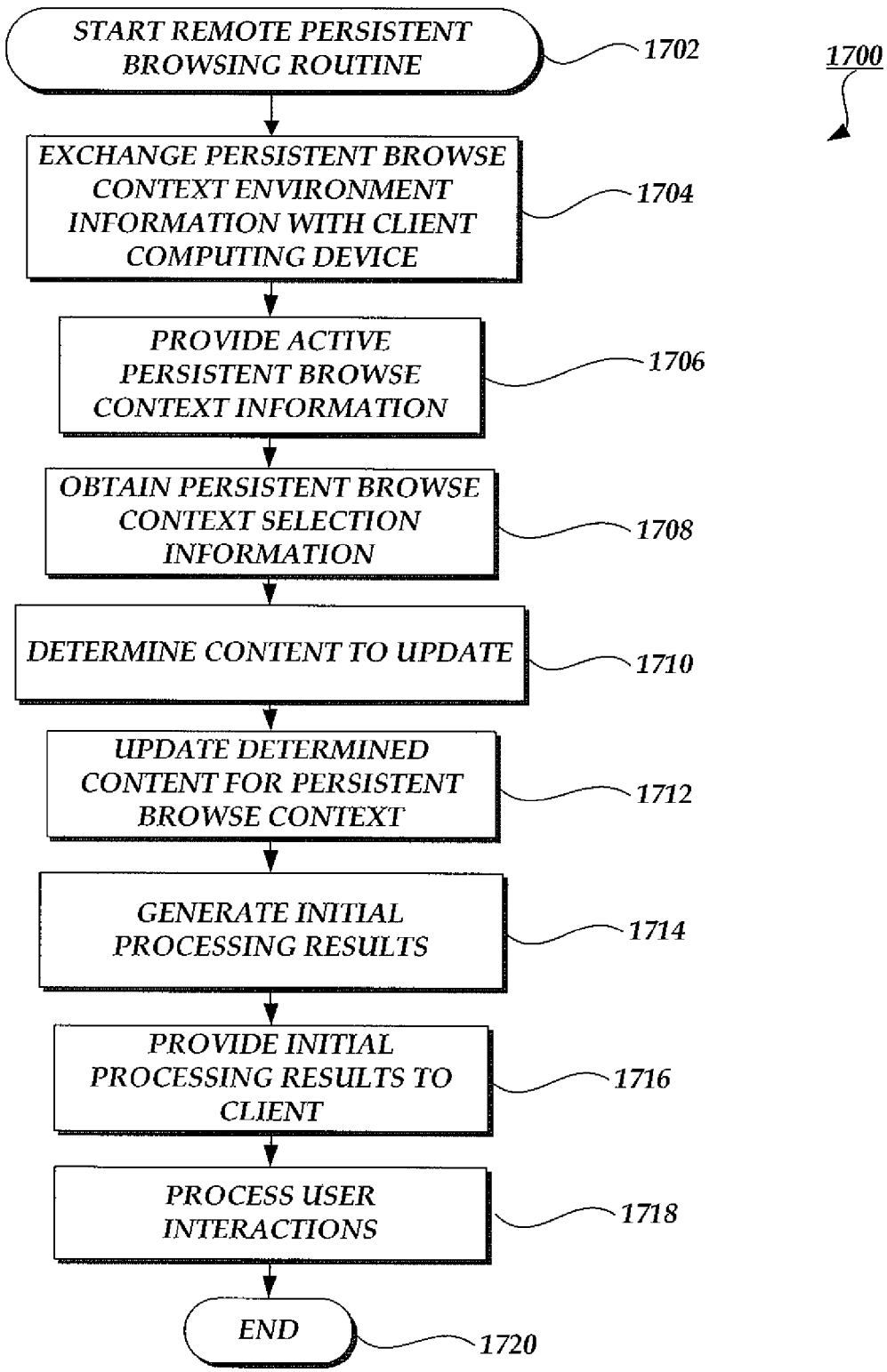
FIG. 17 is a flow diagram illustrative of a remote persistent browsing routine implemented by a network computing provider.

FIG. 17 is a flow diagram illustrative of a remote persistent browsing routine 1700 implemented by a network computing provider 107 of FIG. 1. The remote persistent browsing routine 1700 begins at block 1702. At block 1704, the network computing provider 107 exchanges persistent browsing context environment information with the client computing device 102. As described above with reference to FIG. 8, persistent browsing context environment information may include any number of types of information including, but not limited to, configuration information, identifying information, browse preference information, information regarding currently active persistent browsing contexts, etc. For example, the network computing provider 107 may receive various identifying information, including, but not limited to, device information, software browser information, location information, a user id or other user information, a persistent browsing context environment identifier, etc. In one embodiment, the network computing provider 107 may determine existing persistent browsing contexts associated with one or more pieces of the information. For example, the user at the client computing device 102 may be associated with several existing persistent browsing contexts. As another example, the persistent browsing context environment information may specify a single extant browse session to load.

In a further embodiment, the network computing provider 107 may determine various browser configuration information (e.g., browser style, layout, theme, preferences, history, bookmarks, etc.) associated with one or more pieces of the persistent browsing context environment information. For example, the user at the client computing device 102 may be associated with a set of browse history and bookmarks. Illustratively, in one embodiment, one or more persistent browse content created or accessed by the user may share the associated set of browse history and bookmarks, rather than be associated with a set of browse history and bookmarks corresponding to each individual persistent browse session.

As part of the exchange of persistent browsing context environment information in block 1704, the network computing provider 107 may provide determined browser configuration information or any other information to the client computing device 102 as described above with reference to FIG. 16. In block 1706, the network computing provider may provide active persistent browsing context information such as a list of one or more active persistent browsing contexts associated with one or more aspects of the persistent browsing context environment information to the client computing device 102. Illustratively, the network computing provider 107 may not undertake this step in cases where no active persistent browsing contexts associated with one or more aspects of the persistent browsing context environment information exist, or where the persistent browsing context environment information specifies a particular extant or new persistent browsing context to access.

At block 1708, the network computing provider 107 obtains persistent browsing context selection information from the client computing device 102. In one embodiment, the persistent browsing context selection information identifies an extant active persistent browsing context. From the perspective of the user at the client computing device 102, a persistent browsing context may represent state data and content associated with a browser or other application running at a client computing device 102. For example, the persistent browsing context may be associated with a number of open tabs at the browser, the content displayed in those tabs, a current state of the content displayed, and any browser or application configuration data associated with the browser or display of the content. From the perspective of the network computing provider 107, a persistent browsing context may be associated with stored or cached content corresponding to content displayed at a browser at a client computing device 102, as well as the content state, and the browser state, including any browser configuration information.

In one embodiment, the network computing provider 107 may maintain one or more browse sessions associated with the persistent browsing context at various NCC POPs associated with the network computing provider 107. Illustratively, each browse session may be associated with a different piece of content, browser tab, window, frame, etc. of the browser running at the client computing device 102 as described in FIGS. 9-11 above. In one embodiment, each browse session may be associated with any number of same or different remote browse session configurations. In a further embodiment, the network computing provider 107 may select a new remote browse session configuration for one or more browse sessions associated with a persistent browsing context each time a client computing device 102 accesses the persistent browsing context. For example, if a client computing device with limited processing power accesses an existing persistent browsing context, the network computing provider 107 may select remote browse session configurations for one or more associated browse sessions that allow a majority of processing to be performed at the network computing provider 107.

In another embodiment, the network computing provider 107 may also maintain additional information associated with the persistent browsing context at one or more NCC POP, including, but not limited to, browser configuration information describing a state of the browser at the client computing device 102. In another embodiment, a network computing provider 107 may maintain a software browser application associated with a persistent browsing context at an NCC POP 142. For example, the network computing provider 107 may run a software browser application associated with the persistent browse session in parallel with the browser running at the client computing device 102. Illustratively, the browser running at the network computing provider 107 may maintain content, content state, and browser state associated with the persistent browse session.

At block 1710, the network computing provider 107 may determine whether an update to content associated with the selected persistent browsing context is required. Illustratively, content associated with the selected persistent browsing context may change between being accessed by client computing devices 102. For the purposes of a specific example, a user may view a Web page displaying recent news at a first point in time, and then access the persistent browsing context at a later point in time when the recent news Web page may have changed. In one embodiment, the network computing provider 107 may update changed content (e.g., by re-requesting the content from a content provider, CDN, or cache) before sending processing results corresponding to the content to the client computing device. In other embodiments, the network computing provider 107 may preserve the old page content and/or page state to provide to the client computing device. Providing processing results corresponding to old page content may be desired, for example, when a news article has been changed or taken down since the last access of the persistent browsing context by a client computing device 102.

The network computing provider 107 may determine whether to update content associated with the selected persistent browsing context based on any number of factors including, but not limited to, user options or preferences, an attribute of the content (e.g., size, embedded resources, content type, content category), flags or tags associated with the content, or preferences associated with a network computing provider 107, client computing device 102, browser or application, operating system, CDN service provider 106, content provider 104, or other entity or system. In one embodiment, the network computing provider 107 may provide processing results associated with the old content to the client computing device 102 for display, as well as retrieving and pre-processing the updated content in preparation for a request to update the content.

At block 1712, the network computing provider 107 may update any content for which an update is determined to be necessary in block 1710. Illustratively, this may involve requesting content from a CDN service provider 106, content provider 104, or cache as described above with reference to FIGS. 3 and 4.

At block 1714, the network computing provider 107 may process the content associated with the persistent browsing context to generate processing results corresponding to representations of the content as described in FIGS. 9-11 above. Illustratively, the network computing provider 107 may process the content in view of any saved content state data associated with the persistent browsing context, in order to ensure that the processing results correspond to the last viewed representations of the content.

Illustratively, in one embodiment, a number of different client computing devices 102 with different display capabilities may access a persistent browse session. In one embodiment, the network computing provider 107 may process content associated with the persistent browse session specifically for display on the client computing device currently accessing the persistent browse session. Illustratively, any browser or content state information associated with a persistent browse session that may be inappropriate or unnecessary for display on a particular client computing device may be discarded, or maintained but not utilized in the processing of content and the display of content at the client computing device. For example, a first client computing device 102A may create a new persistent browse session with a network computing provider 107. For the purposes of this specific example, the first client computing device may be a personal computer with a large screen, keyboard, and mouse. A user at the first client computing device 102A may load several Web pages into different tabs of a browser running at the client computing device and connected to the persistent browse session. Illustratively, the web pages loaded at the client computing device may be displayed as formatted for a large screen browse window.

Continuing the specific example, at a later point in time, a second client computing device 102B may access the persistent browse session. Illustratively, the second client computing device 102B may be a smart phone or other device with limited screen size and input capabilities. In one embodiment, the network computing provider may provide processing results to the second client computing device 102B in which the content associated with the persistent browse session is formatted for a small screen. If, in one embodiment, the second client computing device 102B does not have tabbed browsing capabilities, the network computing provider 107 may provide browser configuration information specifying that only the top tab of the persistent browse session is to be displayed, or may provide a list of open tabs associated with the persistent browse session to the second client computing device 102B for a user to select.

At block 1716, the network computing provider 107 may provide the initial processing results to the client computing device, along with any other browser configuration information associated with the persistent browsing context.

At block 1718, the network computing provider 107 may process user interactions with the client computing device, as illustratively described with regard to FIG. 5 and FIG. 11 above.

At block 1720, the routine 1700 ends. In one embodiment, the user may break a connection with the persistent browsing context by closing a browser or powering off the client computing device 102. In some embodiments, the network computing and storage device 107 may place a persistent browsing context in a passive state when no active interaction between the client computing device 102 and the persistent browsing is occurring. Illustratively, placing a persistent browsing context in a passive state may include, but is not limited to, closing a software browser application running on the network computing and storage device 107 that is associated with the persistent browsing context, copying, moving, or storing data associated with various content, content states, or browser states associated with the persistent browsing context, etc. In one embodiment, any changes made when placing a persistent browsing context in a passive state may be undone when the persistent browsing context is later requested by a client computing device 102. The network computing and storage device 107 may place a persistent browsing context in a passive state based on any number of factors including, but not limited to, a time-out of interaction data from the client computing device 102, user options or preferences, an attribute of the content (e.g., size, embedded resources, content type, content category), flags or tags associated with the content, or preferences associated with a network computing provider 107, client computing device 102, browser or application, operating system, CDN 106, content provider 104, or other entity or system.

While illustrative embodiments have been disclosed and discussed, one skilled in the relevant art will appreciate that additional or alternative embodiments may be implemented within the spirit and scope of the present invention. For example, the techniques described herein may be utilized, without departing from the scope of the present invention, to allow remote processing management in any number of other software applications and processes, including, but not limited to, image or video editing software, database software, office productivity software, 3d design software, audio and sound processing applications, etc. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for remote session browsing comprising:
    obtaining, by a network computing provider comprising one or more server computing devices, a request for a persistent browsing context from a first client-side browser application executing on a first client computing device;
    initializing a server-side browser application, separate from the first client-side browser application, on a server computing device of the network computing provider in response to the request for the persistent browsing context;
    obtaining content requested by the first client-side browser application, the content comprising a network resource referencing one or more embedded resources, wherein the content requested by the first client-side browser application is to be processed by a plurality of processing actions to the render the content, wherein the server-side browser application is configured to perform each of the plurality of processing actions to render the content, and wherein the first client-side browser application is also configured to perform each of the plurality of processing actions to render the content;
    generating, by the server-side browser application, a first processing result by performing at least a portion of the plurality of processing actions to render the content, wherein the first processing result is associated with a first state of the requested content, and wherein the first processing result corresponds to a first representation of the requested content for display on the first computing device;
    providing the first processing result to the first client computing device, wherein the first client computing device is configured to display the first representation of the requested content;
    obtaining a request to access the persistent browsing context from a second client-side browser application executing on a second client computing device separate from the first client computing device; and
    providing a second processing result to the second client computing device, wherein the second processing result is generated based, at least in part, on the first state of the requested content, wherein the first state of the requested content is based on one or more user interactions with the first representation of the requested content displayed at the first client computing device, wherein the second processing result corresponds to a second representation of the requested content for display at the second client computing device, and wherein the second client computing device is configured to display the second representation of the requested content.

2. The computer-implemented method of claim 1, wherein the first client computing device and the second client computing device are associated with the same user.

3. The computer-implemented method of claim 1, wherein the second processing result comprises the first processing result.

4. The computer-implemented method of claim 1 further comprising:
   obtaining a request for a second persistent browsing context by a third client-side browser application executing on a third client computing device; and
   providing one or more processing results to the third client computing device, wherein the one or more processing results correspond to a one or more representations of content requested by the third client-side browser application, and wherein the third client computing device is configured to display the first representation of the requested content.

5. A computer-implemented method for remote session browsing comprising:
   as implemented by a network computing provider comprising one or more server computing devices,
      obtaining, by a server-side browser application executing at the network computing provider, a request for a first persistent browsing context from a first client-side browser application, separate from the server-side browser application, executing on a first client computing device, wherein the server-side browser application is configured to perform a plurality of processing actions to render content associated with persistent browsing contexts;
      generating, by the server-side browser application, first processing results by performing at least a portion of the plurality of processing actions to render content associated with the first persistent browsing context;
      providing, by the network computing provider, the first processing results to the first client computing device, wherein the first processing results correspond to a first representation of content responsive to the first persistent browsing context, and wherein the first representation of the content corresponds to a first state of the content requested by the first client-side browser application;
      obtaining, by the server-side browser application executing at the network computing provider, a request to access a second persistent browsing context by a second client-side browser application, separate from the server-side browser application, executing on a second client computing device separate from the first client computing device, wherein the first and second persistent context are the same;
      generating, by the server-side browser application, second processing results by performing at least a portion of the plurality of processing actions to render content associated with the second persistent browsing context;
      providing, by the network computing provider, the second processing results to the second client computing device, wherein the second processing results correspond to a second representation of the content associated with the second persistent browsing context, and wherein the second representation of the content corresponds to the first state of the content requested by the first client-side browser application, the first state based on one or more user interactions with the first representation of the content displayed at the first client computing device.

6. The computer-implemented method of claim 5, wherein the second processing results include the first processing results.

7. The computer-implemented method of claim 5 further comprising:
   obtaining, by the server-side browser application executing at the network computing provider, a request for a third persistent browsing context by a third client-side browser application executing on a third client computing device; and
   providing, by the network computing provider, third processing results to the third client computing device, wherein the third processing results correspond to a third representation of content requested by the third client-side browser application.

8. The computer-implemented method of claim 7 further comprising duplicating the first persistent browsing context to generate the third persistent browsing context.

9. The computer-implemented method of claim 8, wherein user interactions with representations of content associated with the third persistent browsing context do not modify the first persistent browsing context.

10. The computer-implemented method of claim 7, wherein the first persistent browsing context and the second persistent browsing context are associated with the same shared browser configuration information.

11. The computer-implemented method of claim 10, wherein the shared browser configuration information includes at least one of persistent browsing context display preferences, bookmark information, browser application visual appearance preferences, and browse history common to the first persistent browsing context and the second persistent browsing context.

12. The computer-implemented method of claim 7, wherein the third client computing device comprises at least one of the first client computing device and the second client computing device.

13. The computer-implemented method of claim 12, wherein the third client computing device is configured to display the first representation of the requested content and the third representation of the requested content in at least one of separate software browser application windows, separate browser frames, and separate browser tabs.

14. A system for remote session browsing comprising:
   one or more computer processors;
   at least one computer memory accessible by at least one of the one or more computer processors; and
   a network computing component comprising an executable software module executed by the one or more computer processors, wherein the network computing component is operable to:
      execute a server-side browser application, wherein the server-side browser application is configured to perform a plurality of processing actions to render content associated with persistent browsing contexts;

obtain a request for a persistent browsing context from a first client-side browser application, separate from the server-side browser application, executing on a first client computing device;

generate, by the server-side browser application, first processing results by performing at least a portion of the plurality of processing actions to render content associated with the persistent browsing context, wherein the first processing results correspond to a first representation of the content for display at the first client computing device, and wherein the first representation of the content corresponds to a first state of the content requested by the first client-side browser application;

obtain a request to access the persistent browsing context from a second browser application, separate from the server-side browser application, executing on second client computing device separate from the first client computing device; and generate, by the server-side browser application, first processing results by performing at least a portion of the plurality of processing actions to render the content associated with the persistent browsing context, wherein the second processing results correspond to a second representation of the content for display at the second client computing device, and wherein the second representation of the content corresponds to the first state of the content requested by the first client-side browser application, the first state based on one or more user interactions with the first representation of the content displayed at the first client computing device.

15. The system of claim 14, wherein the second one or more processing results comprises the first one or more processing results.

16. The system of claim 14, wherein the network computing component is further operable to:

obtain a request for a subsequent persistent browsing context from a third client-side browser application executing on a third client computing device; and provide a third processing results to the third client computing device, wherein the third processing results correspond to a third representation of content requested by the third client computing device, and wherein the third client computing device is configured to display the third representation of the requested content.

17. The system of claim 16, wherein the network computing component is further operable to duplicate the persistent browsing context to generate the subsequent persistent browsing context.

18. The system of claim 17, wherein user interactions with representations of content associated with the subsequent persistent browsing context do not modify the persistent browsing context.

19. The system of claim 16, wherein the persistent browsing context and the subsequent persistent browsing context are associated with shared browser configuration information.

20. The system of claim 19, wherein the shared browser configuration information includes at least one of persistent browsing context display preferences, bookmark information, browser application visual appearance preferences, and browse history common to the persistent browsing context and the subsequent persistent browsing context.

21. The system of claim 16, wherein the third client computing device comprises at least one of the first client computing device and the second client computing device.

22. The system of claim 21, wherein the third client computing device is configured to display the first representation of the requested content and the third representation of the requested content in at least one of separate software browser application windows, separate browser frames, and separate browser tabs.

* * * * *